United States Patent
Wakashiro et al.

(10) Patent No.: US 6,886,649 B2
(45) Date of Patent: May 3, 2005

(54) CONTROL DEVICE FOR HYBRID VEHICLES

(75) Inventors: Teruo Wakashiro, Shioya-gun (JP);
Atsushi Matsubara, Utsunomiya (JP);
Hideyuki Takahashi, Utsunomiya (JP);
Kan Nakaune, Kawachi-gun (JP);
Shinichi Kitajima, Utsunomiya (JP);
Yasuo Nakamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 60 days.

(21) Appl. No.: 10/046,293

(22) Filed: Jan. 16, 2002

(65) Prior Publication Data

US 2002/0112902 A1 Aug. 22, 2002

(30) Foreign Application Priority Data

Feb. 20, 2001 (JP) .................................... P2001-043929

(51) Int. Cl.$^7$ ................................................. B60K 1/00
(52) U.S. Cl. .................................. 180/65.2; 123/198 F
(58) Field of Search .............................. 180/65.2, 65.3, 180/65.4, 65.6, 65.7, 65.8; 60/712, 698; 701/22, 112; 318/139; 477/2, 3; 123/481, 198 F; 290/40 R, 41, 40 A, 40 B, 40 C, 40 F; 322/14, 15, 16

(56) References Cited

U.S. PATENT DOCUMENTS

| | | | | |
|---|---|---|---|---|
| 5,725,064 A | * | 3/1998 | Ibaraki et al. | 180/65.2 |
| 6,223,846 B1 | * | 5/2001 | Schechter | 180/165 |
| 6,389,807 B1 | * | 5/2002 | Suzuki et al. | 180/65.3 X |
| 6,487,998 B1 | * | 12/2002 | Masberg et al. | 123/192.1 |
| 6,516,254 B1 | * | 2/2003 | Wakashiro et al. | 701/22 |
| 6,687,603 B2 | * | 2/2004 | Wakashiro et al. | 701/110 |
| 6,692,404 B2 | * | 2/2004 | Matsubara et al. | 477/4 |
| 6,694,232 B2 | * | 2/2004 | Saito et al. | 701/22 |
| 2003/0054919 A1 | * | 3/2003 | Matsubara et al. | 477/4 |
| 2003/0102175 A1 | * | 6/2003 | Wakashiro et al. | 180/65.4 |
| 2003/0217728 A1 | * | 11/2003 | Hasebe et al. | 123/198 F |
| 2003/0221883 A1 | * | 12/2003 | Kubodera et al. | 180/65.2 |
| 2003/0236599 A1 | * | 12/2003 | Saito et al. | 701/22 |
| 2004/0012206 A1 | * | 1/2004 | Wakashiro et al. | 290/40 C |
| 2004/0035113 A1 | * | 2/2004 | Hanada et al. | 60/698 |

FOREIGN PATENT DOCUMENTS

JP      2000-291461     * 10/2000

OTHER PUBLICATIONS

U.S. patent application Publication 2003/0056510—dated Mar. 2003.*

* cited by examiner

Primary Examiner—Bryan Fischmann
(74) Attorney, Agent, or Firm—Armstrong, Kratz, Quintos, Hanson & Brooks, LLP

(57) ABSTRACT

A control apparatus for a hybrid vehicle which includes an all cylinder deactivated operation execution flag F_ALCS for executing the all cylinders deactivated operation, when it is determined that the all cylinders deactivated operation is appropriate by the all cylinders deactivation standby flag F_ALCSSTB for determining the appropriateness of the all cylinders deactivated operation and the all cylinders deactivation release conditions realization flag F_F_ALCSSTP for determining the appropriateness of releasing the all cylinders deactivated operation, based on the all cylinders deactivation solenoid flag F_ALCSSOL for operating a spool valve, for determining an appropriateness of the operation of the solenoid valve, the all cylinder deactivation standby flag F_ALCSSTB, the all cylinder deactivation conditions realization flag F_ALCSSTP, the all cylinder deactivation solenoid flag F_ALCSSOL.

6 Claims, 10 Drawing Sheets

CONTROL DEVICE FOR HYBRID VEHICLES

BACKGROUND OF THE INVENTION

1. Field of the Invention

The present invention relates to a control device for hybrid vehicles, and in particular, relates to a control device for hybrid vehicles, which can improve the fuel consumption efficiency by conducting cylinder deactivated driving under certain vehicle driving conditions.

2. Description of the Related Art

Conventionally, hybrid vehicles having an engine and a motor as a drive source are known. Among hybrid vehicles, one type of hybrid vehicle called a parallel hybrid vehicle is known, in which an output of the engine is assisted by a motor.

In the above-described parallel hybrid vehicle, a control apparatus drives the motor for assisting the engine when the vehicle is in the acceleration mode, and the battery is charged by deceleration regeneration of the motor when the vehicle is in the deceleration mode, such that the vehicle can respond to the driver's demands while ensuring the remaining battery charge (electric energy). Because the hybrid vehicle is formed by connecting the engine directly with the motor, this parallel hybrid vehicle has an advantage in that the structure is simple and the total system can be light in weight, thereby improving equipment installation capability in the vehicle.

In order to eliminate the effect of friction (engine braking) of the engine at the time of deceleration regeneration, several mechanisms have been proposed, such as a mechanism, which includes a clutch between the engine and the motor (for example, Japanese Patent Application, First Publication No. 2000-97068), and a mechanism, in which the engine, the motor, and the transmission are connected in series (for example, Japanese Patent Application, First Publication No. 2000-125405).

However, the mechanism comprising a clutch between the engine and the motor have drawbacks in that the structure becomes complicated by inserting the clutch and the installing capability of the vehicle is reduced so that insertion of the clutch reduces transmission efficiency of the power transmission system. In contrast, when the engine, motor, and the transmission are connected in series, a problem arises in that the above-described friction of the engine reduces the regeneration energy and the regeneration energy is reduced so that the assist amount by the motor is limited.

A measure to reduce the friction loss of the cylinder at the time of deceleration is proposed to control the throttle valve in the opening side in the deceleration mode of the vehicle by employing an electronic controlled throttle mechanism for sharply reducing the pumping loss and for increasing the regeneration which occurs during deceleration. However, the above measure has a problem in that, because fresh air is introduced into the exhaust system, the temperatures of a catalyst or an A/F (air/fuel) sensor are reduced so that the optimum control of the exhaust gas is degraded.

SUMMARY OF THE INVENTION

In order to solve the above-described problems, the present invention provides a control apparatus of a hybrid vehicle comprising the driving power sources composed of an engine (for example, an engine E in the embodiment) and a motor (for example, a motor M in the embodiment), wherein the motor generates regenerative power during deceleration depending on the deceleration state of the vehicle and the engine is a type of engine capable of executing an all cylinders deactivated operation, and wherein the control apparatus comprises a cylinder deactivation determination means (for example, the all cylinder deactivated operation standby flag F_ALCSSTB in the embodiment) for determining whether it is appropriate for the engine to enter a cylinder deactivated operation based on driving conditions of the vehicle, a cylinder deactivation release determination means (for example, the all cylinders deactivated operation release conditions realization flag F_ALCSSTP in the embodiment) for determining whether it is appropriate for the engine during the cylinder deactivated operation to release the cylinder deactivated operation based on the vehicle conditions, a cylinder deactivation execution means (for example, the all cylinders deactivated operation solenoid flag F_ALCSSOL in the embodiment) for operating an actuator (for example, the spool valve SV in the embodiment) for executing the cylinder deactivated operation, when the cylinder deactivation determination means executes the cylinder deactivated operation, an operation appropriateness determination means (for example, step S110, step S117, step S112, and step S119 in the embodiment) for determining whether the operation of the actuator is appropriate, and a cylinder deactivation control means (for example, the all cylinders deactivated operation execution flag F_ALCS in the embodiment) for controlling the deactivation operation of the engine based on the cylinder deactivation determination means, the cylinder deactivation release determination means, the cylinder deactivation execution means, and the operation appropriateness determination means.

By constituting the control means for a hybrid vehicle as described in one aspect, it becomes possible for the engine to enter the all cylinder deactivated operation when the cylinder deactivation operation determination means determines that the engine can be subjected to the cylinder deactivated operation, when the cylinder deactivation execution means operates the actuator, and when the operation appropriateness determination means determines that the actuator is reliably operated.

In addition, the engine can be returned to the normal cylinder operation by the cylinder deactivation control means when the cylinder deactivation release determination means determines that the engine in the cylinder deactivated operation can be released from the cylinder deactivated operation, when the cylinder deactivation execution device releases the operation of the actuator, and when the operation appropriateness determination means determines that the operation of the actuator is reliably released.

According to another aspect of the present invention, in the above control apparatus for a hybrid vehicle, the cylinder deactivation execution means operates the actuator after the passage of a predetermined time (for example, the time value TALCSDLY1 or TALCSDLY2 in the embodiment) after determinations by the cylinder deactivation determination means or the cylinder deactivation release determination means.

By constituting the control apparatus for a hybrid vehicle as described this aspect, it is possible to secure the time required for the operation to converts into the cylinder deactivated operation or into the normal operation.

According to another aspect of the present invention, in the above control apparatus for a hybrid vehicle, the cylinder deactivation control means actuates or release the actuator after the passage of a predetermined time interval (for example, the timer values TCSDLY2 or TCSDLY1 in the embodiment) set by the operation appropriateness determination means.

By constituting the control apparatus for a hybrid vehicle as described in this aspect, since the operation appropriateness determination means determines to enter or release the cylinder deactivated operation by the cylinder deactivation control means after a predetermined time interval, it is possible to determine a time for reliably operating the actuator.

According to another aspect, in the above control apparatus for a hybrid vehicle, when the engine enters the cylinder deactivated operation by the cylinder deactivation execution means, an intake valve (for example, the intake valve IV in the embodiment) and an exhaust valve (for example, the exhaust valve EV in the embodiment) of each cylinder are both closed.

By constituting the control apparatus for a hybrid vehicle as described in this aspect, it is possible to reduce the energy loss due to pumping or friction of cylinders, and also to suppress the inflow of the fresh air into the exhaust system.

According to another aspect, in the above control apparatus for a hybrid vehicle, the actuator to be actuated by the cylinder deactivation execution means is a mechanism for changing operational states of an intake valve and an exhaust valve by an oil pressure (for example, the oil temperature TOIL in the embodiment), and a predetermined time is set depending on the oil temperature.

By constituting the control apparatus for a hybrid vehicle as described in this aspect, it is possible to maintain the timing of the operation of the intake valve and the exhaust valve even if the oil temperature changes by reliably operating the intake valve and the exhaust valve by the hydraulic pressure.

According to another aspect of the present invention, in the above control apparatus for a hybrid vehicle, the actuator which is operated by the cylinder deactivation execution means is a mechanism for changing the operational states of an intake valve and an exhaust valve, and the operation appropriateness determination means determines the appropriateness of the actuator based on the oil pressure (for example, the oil pressure POIL in the embodiment).

By constituting the control apparatus for a hybrid vehicle as described in this embodiment, when the oil pressure is operated, it is possible to determine whether or not the hydraulic pressure is reliably operated.

BRIEF DESCRIPTION OF THE DRAWINGS

FIGS. 3A and 3B are diagrams showing the variable timing mechanism, wherein FIG. 3A shows a cross-sectional view of the main portion of the variable timing mechanism when all cylinders are in the activated state, and FIG. 3B is a cross-sectional view of the main portion of the variable timing mechanism when all cylinders are in the deactivated state.

DETAILED DESCRIPTION OF THE INVENTION

Hereinafter, some embodiments of the present invention will be described with reference to the attached drawings.

Figure 1:
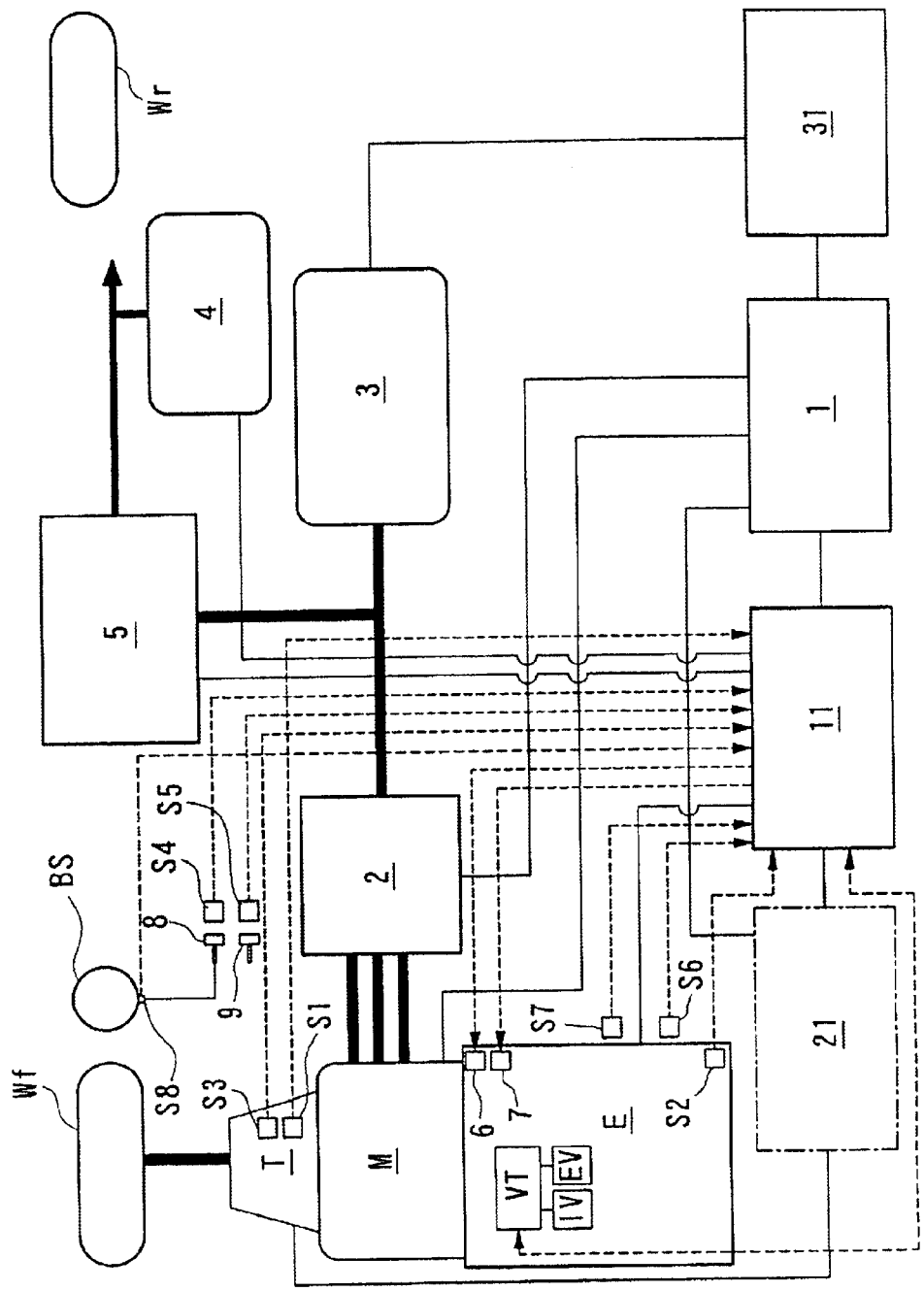
FIG. 1 is a diagram showing the schematic structure of a parallel hybrid vehicle according to one embodiment of the present invention.

FIG. 1 is a diagram showing the schematic structure of a parallel hybrid vehicle according to one embodiment of the present invention, and the parallel hybrid vehicle comprises an engine E, motor M, and transmission T, all of which are connected in series. Driving power of both engine E and motor M is transmitted to driving wheels Wf and Wf, corresponding to front wheels, through a transmission, which is constituted either by an automatic transmission or a manual transmission. When the decelerating driving force is transmitted from the front wheels Wf and Wf to the motor M at the time of deceleration of the hybrid vehicle, the motor functions as a generator for generating regenerative braking, and the kinetic energy of the vehicle is recovered as electric energy. Note that the symbol Wr denotes a rear wheel.

The drive and the regeneration operation is conducted by a power drive unit 2 based on a control command from a motor ECU 1 (motor Electronic Control Unit). the power drive unit 2 is connected with a high voltage battery 3, and the high voltage battery 3 is formed by connecting a plurality of modules in series, wherein the module is composed of a plurality of cells in series. The hybrid vehicle also includes a 12V auxiliary battery 4 in order to actuate various auxiliary machines and this 12V battery 4 is connected to the battery 3 through a downverter 5. The downverter 5, which is controlled by FIECU (Fuel Injection Electronic Control Unit) 11, charges the auxiliary battery 4 after stepping down the voltage of the battery 3.

The FIECU 11 controls, together with the motor ECU 1 and the downverter 5, an operation of the fuel supply amount control device 6 for controlling the fuel amount supplied to the engine E, an operation of a starter motor 7, and ignition timing. The FIECU 11 receives various input signals such as a signal from a vehicle speed sensor S1 which detects the vehicle speed based on the rotation speed of the driving axis of the transmission, a signal from an engine rotation speed sensor S2 for detecting the engine rotation speed NE, a shift position sensor S3 for detecting the shift position of the transmission T, a signal from a brake switch S4 for detecting the operation of the brake pedal 8, a signal from a clutch switch S5 for detecting the operation of the clutch pedal 9, a signal from a throttle opening degree sensor S6 for detecting the throttle opening degree TH, and a signal from a suction pipe pressure sensor S7 for detecting the suction pipe pressure PBGA. Reference numeral 31 denotes a battery ECU (battery Electronic Control Unit) For protecting the battery 3 and for calculating a remaining charge QBAT of the battery 3. Note that, as shown by a chain line in FIG. 1, a CVTECU 21 is provided in the case of the CVT vehicle, wherein "CVTECU 21" represents an "Electronic Control Unit for CVT Vehicles".

Reference symbol BS denotes a booster linked with the brake pedal 8, and the booster BS is provided with a pressure sensor S8 for detecting a negative pressure (MPGA) in a brake master power cylinder.

Note that this pressure sensor S8 is connected to the engine FIECU11.

Here, the above-described engine E is an engine which perform an all cylinders deactivated operation, capable of freely switching between an all cylinders activated operation (normal operation) and an all cylinders deactivated operation, in which all cylinders are deactivated. As shown schematically in FIG. 1, an intake valve IV and an exhaust valve EV of each cylinder of the engine E is constructed so as to deactivate each cylinder by a variable valve timing mechanism VT. The variable valve timing mechanism VT is connected to the FIECU11.

Practical explanations are provided below with reference to FIGS. 2 and 3.

Figure 2:
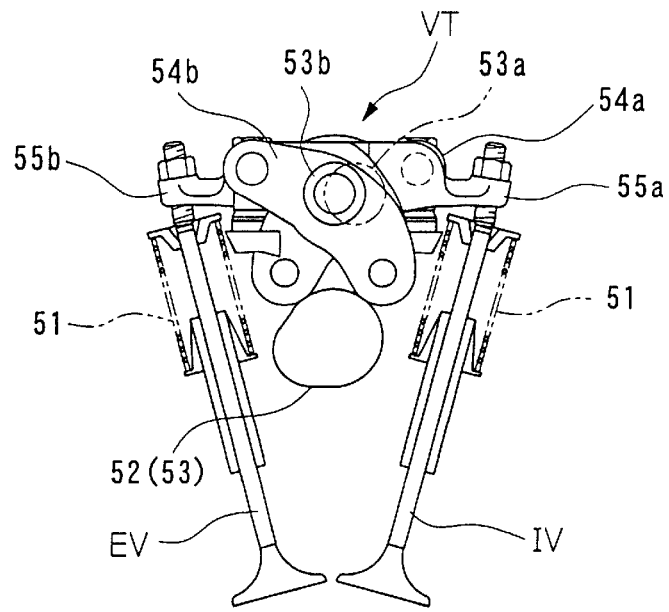
FIG. 2 is a front view showing the variable timing mechanism according to one embodiment of the present invention.

FIG. 2 shows an example in which a variable valve timing mechanism VT is applied to a SOHC-type engine for driving the engine in the all cylinders deactivated operation state. The intake valve IV and the exhaust valve EV are provided in a cylinder (not shown), and these valves are biased by valve springs 51 and 51 in the direction to close the intake port (not shown) and the exhaust port (not shown). Reference numeral 52 denotes a lift cam provided with the cam shaft 53, and the lift cam 52 is linked with an intake valve side rocker arms 54a and an exhaust valve side rocker arm 54b, which are rotatably supported through the intake valve side and exhaust valve side rocker arm shafts 53a and 53b.

Valve driving rocker arms 55a and 55b are rotatably supported by respective rocker arm shafts 53a and 53b in the vicinity of the rocker arms 54a and 54b for being lifted by the cam. In addition, rotation ends of the valve driving rocker arm 55a and 55b push the upper ends of the intake valve IV and the exhaust valve EV so that the intake valve IV and the exhaust valve EV are opened. Note that the lower ends (the opposite ends of the valve abutting portions) of the valve driving rocker arms 55a and 55b are constructed so as to be in slidable contact with a circular cam 531 mounted to the cam shaft 53.

FIG. 3 is a diagram, showing the exhaust valve as an example, the cam lift rocker arm 54b and the valve driving rocker arm 55b.

Figure 3A:
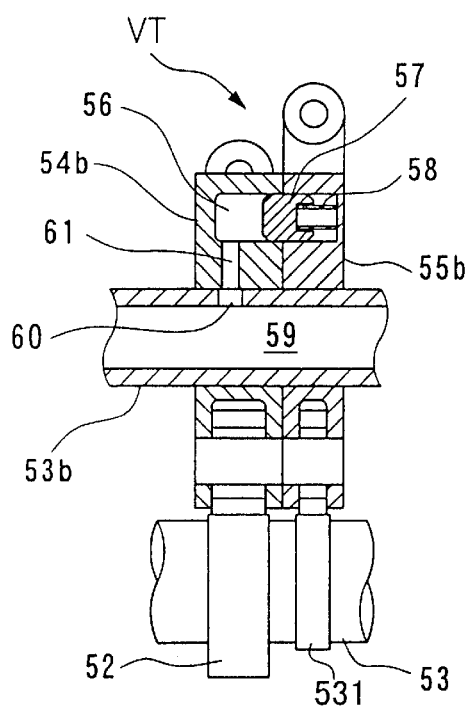
Figure 3B:
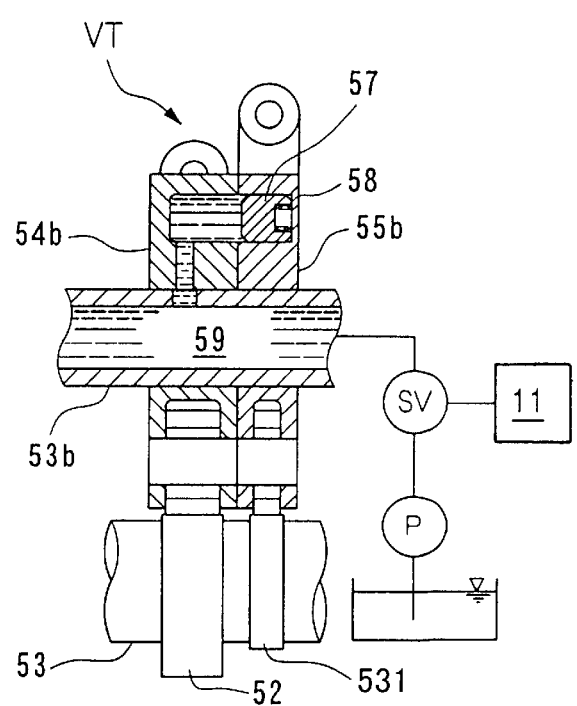

In FIGS. 3A and 3B, in between the cam lift rocker arm 54b and the valve driving rocker arm 55b, a pressure oil chamber 56 is formed at the opposite side of the lift cam 52 centering around the exhaust valve side rocker arm shaft, crossing the cam lift rocker arm 54b and the valve driving rocker arm 55b. A pin 57 is slidably mounted in the pressure oil chamber 56, and this pin 57 is biased by a pin spring 58 toward the cam lift rocker arm 54b.

A pressure oil supply passage 59 is formed inside of the exhaust valve side rocker arm shaft 53b, and this pressure oil supply passage 59 is communicated with the pressure oil chamber 56 through an opening 60 of the pressure oil passage 59 and a communication passage 61 of the cam lift rocker arm 54b. Hydraulic fluid from the oil pump P is supplied to the pressure oil supply passage 59 by switching the spool valve SV, which operates as an actuator. A solenoid of the spool valve SV is connected to the FIECU 11.

When the hydraulic pressure is not applied through the pressure oil supply passage 59, the pin 57 is located at a position riding on both of the cam lift rocker arm 54b and the valve drive rocker arm 55b, as shown in FIG. 3A. In contrast, when the hydraulic pressure is applied, the pin 57 slides toward the valve drive rocker arm 55b opposing to the pin spring 58 and the connection between the cam lift rocker arm 54b and the valve drive rocker arm 55b is released. Note that the intake side has the same configuration.

Accordingly, when preliminary conditions for executing the all cylinders deactivated operation are satisfied and the releasing conditions for releasing the all cylinders deactivated operation are not satisfied, the solenoid of the spool valve SV is actuated to the ON state (F_ALCS=1), both of the intake valve side and the exhaust valve side apply the oil pressure to the pressure oil chamber 56 through the pressure oil supply passage 59. The pins 57 and 57 which unite the cam lift rocker arms 54a and 54b and the valve drive rocker arm 55a and 55b, respectively, move towards the valve drive rocker arms 54a and 54b, and the connections of the earn lift rocker arms 54a and 54b with respective valve drive rocker arms 55a and 55b are released.

The cam lift rocker arms 54a and 54b are driven by the rotation movement of the lift cam 52. However, because the connections with respective cam lift rocker arm 54a and 54b by the pins 57 and 57 are released, the valve drive rocker arms 55a and 55b do not move by racing circular cam 531, or because the cam lifts rocker arms 54a and 54b, the valve drive rocker arms 55a and 55b do not open each of the intake and exhaust valves IV and EV. Each valve is left in a closed state, which makes it possible to execute the all cylinders deactivated operation.

MA (motor) Basic Mode

An explanation is provided below about the MA (motor) basic mode, which determines in which mode the motor M is driven, with reference to FIGS. 4 and 5.

Note that the MA (motor) basic mode determination is executed repeatedly at a predetermined interval.

Here, the MA (motor) basic modes include "idle mode", "idle stop mode", "deceleration mode", "cruise mode", and "acceleration mode". In the idle mode, the engine is maintained at an idle state by reopening a fuel supply after the fuel cut. In the idle stop mode, the engine is stopped under certain conditions, for example, in the case in which the vehicle is stopped. In the deceleration mode, regenerative braking is carried out, in the acceleration mode, the driving by the engine E is assisted by the motor M, and in the cruise mode, the motor is not activated and the vehicle travels by the driving force of the engine E. In the above-described deceleration mode, the all cylinders deactivated operation is conducted.

Figure 4:
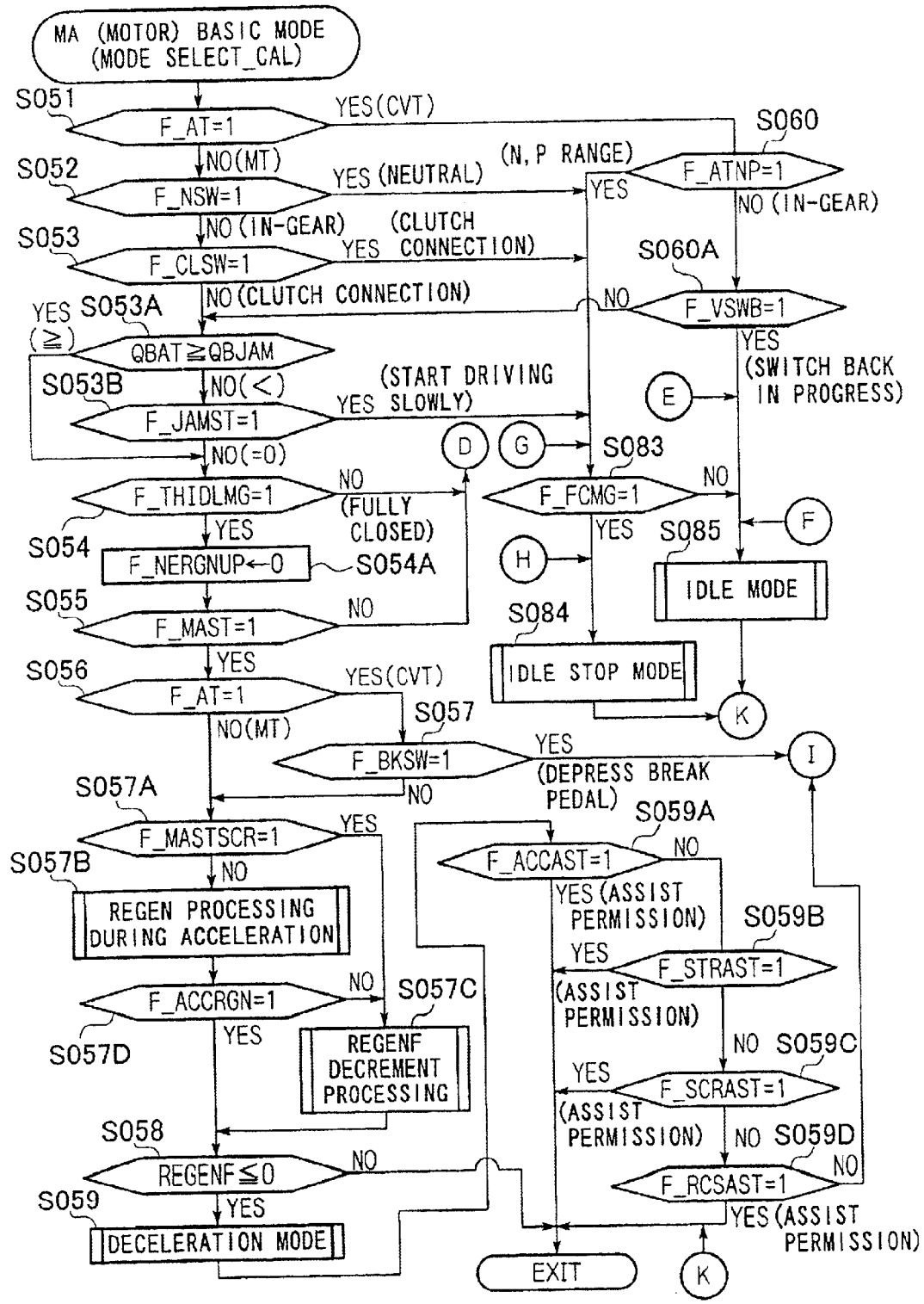
FIG. 4 is a flow-chart showing an MA (motor) basic mode according to one embodiment of the present invention.
Figure 5:
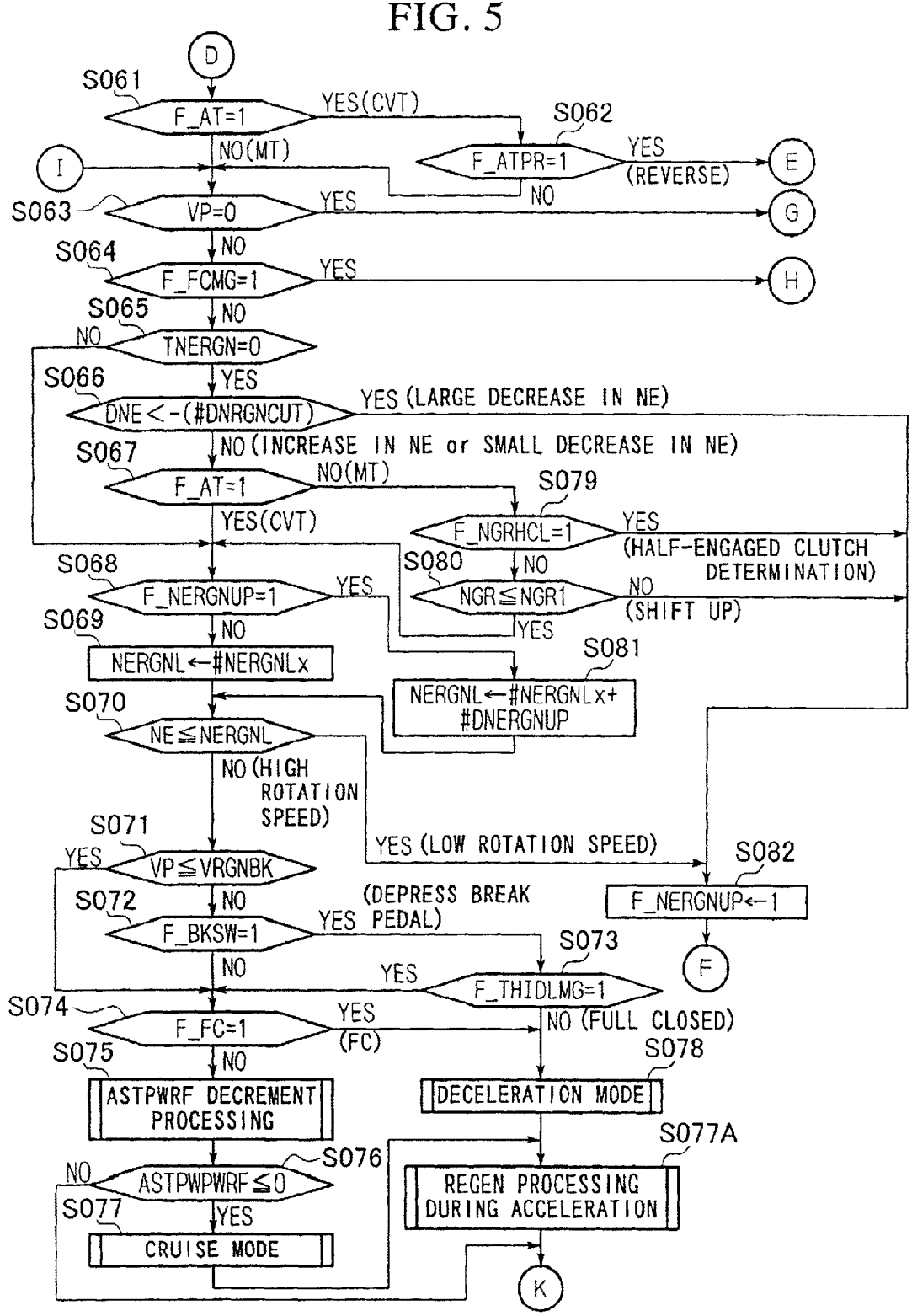
FIG. 5 is a flow-chart showing an MA (motor) basic mode according to one embodiment of the present invention.

In step S051 in FIG. 4, it is determined whether the MT/CVT determination flag F_AT is "1". When the determination result is "YES" (CVT vehicle), the flow proceeds to step S60, and if the determination result is "NO" (MT vehicle), the flow proceeds to step S052. In step S60, it is determined whether an in gear flag for CVT vehicle F_ATNP is "1". When the determination is "YES" (N, P range), the flow proceeds to step S083, and if the determination is "NO" (in gear), the flow proceeds to step S060A.

In step S060A, it is determined whether the vehicle is in a switch back state (shift position cannot be determined because the shift lever is operating) by determining whether a switch back flag F_VSWB is "1". When the determination is "YES" (in the switch back state), the flow proceeds to step S085, wherein the mode is determined as the "idle mode" and the control is completed. In the idle mode, the engine E is maintained at the idle state. If the determination result in step S060A is "NO" (not in the switch back state), the flow proceeds to step S053A.

In step S083, it is determined whether an engine stop control execution flag F_FCMG is "1". If the determination in Step S083 is "NO", the flow proceeds to step S084, wherein the mode is determined as the "idle mode" and the control is completed. When the determination in step S083 is "YES", the flow proceeds to step S084, wherein the mode is determined as the "idle stop mode" and the control is completed. In the idle stop mode, the engine E is stopped under certain conditions such as the case of vehicle stop.

In step S052, it is determined whether a neutral position determination flag F_NSW is "1". When the determination is "YES" (neutral position), the flow proceeds to step S083, and if the determination is "NO" (in gear), the flow proceeds to step S053.

In step S053, it is determined whether the clutch connection determination flag F_CLSW is "1". When the determination is "YES" (clutch disconnected), the flow proceeds to step S083, and when the determination is "NO" (clutch connected), the flow proceeds to step S053A.

In step S053A, it is determined whether the remaining battery charge QBAT is above the low speed start determination remaining battery charge QBJAM. When the determination is "YES", the flow proceeds to step S054, and if the determination is "NO", the flow proceeds to step S053B.

In step S053B, it is determined whether the low speed start determination flag F_JAMST is "1". The low speed start determination flag F_JAMST is the flag to be set as "1" when the vehicle starts at low speed and the speed remains at a low speed without the speed increasing. When the determination in the step S053B is "YES", the flow proceeds to step S083. If the determination in step S053B is "NO", the flow proceeds to step S054. That is, when the remaining battery charge is low, when the vehicle travels at low speed, and the driver still does not intend to accelerate the vehicle, it is desirable to determine the driving mode of the vehicle as the "idle mode" or the "idle stop mode" (in order to make the motor generate power at the idle mode or to stop the engine at the idle stop mode).

In step S054, it is determined whether an IDLE determination flag F_THIDLMG is "1". If the determination is "NO" (fully closed), the flow proceeds to step S061, and when the determination is "YES" (not fully closed), the flow proceeds to step S054A.

In step S054A, an engine rotation speed increase flag at an half engaged clutch F_NERGUNP is set to "0", and the flow proceeds to step S055. Note that this engine rotation speed increase flag at a half engaged clutch F_NERGUNP will be described later.

In step S055, it is determined whether the motor assist determination flag F_MAST is "1". This flag determines whether the engine needs an assist by the motor M. When the flag value is "1", it is determined that the engine needs an assist by the motor, and when the flag value is "0", it means that the engine does not need the assist by the motor M. Note that this motor assist determination flag is set by an assist trigger determination processing.

When the determination in step S055 is "NO", the flow proceeds to step S061. When the determination in step S055 is "NO", the flow proceeds to step S056.

In step S061, it is determined whether the MT/CVT determination flag F_AT is "1". When the determination is "NO" (MT vehicle), the flow proceeds to step S063, and when the determination is "YES" (CVT vehicle), the flow proceeds to step S062.

In step S062, it is determined whether the reverse position determination flag F_ATPR is "1". When the determination is "YES" (reverse position), the flow proceeds to step S085, and if the determination is "NO" (not reverse position), the flow proceeds to step S063.

In step S056, it is determined whether the MT/CVT determination flag, F_AT is "1". When the determination is "YES" (CVT vehicle), the flow proceeds to step S057, and if the results is "NO" (MT vehicle), the flow proceeds to step S067A.

In step S057, it is determined whether the brake ON determination flag F_BKSW is "1". When the determination result is "YES" (brake ON), the flow proceeds to step S063, and if the result is "NO" (brake OFF), the flow proceeds to step S057A.

In step S063, it is determined whether the vehicle speed is "0". When the determination is "YES", the flow proceeds to step S083, and if the determination is "NO", the flow proceeds to step S064.

In step S064, it is determined whether the engine stop control execution flag F_FCMG is "1". If the result is "NO", the flow proceeds to step S065, and when the result is "YES", the flow proceeds to step S084.

In step S065, it is determined whether the shift change forced REGEN release determination processing delay timer TNERGN is "0". When the result is "YES", the flow process to step S066, and if the result is "NO", the flow proceeds to step S068.

In step S066, it is determined whether the rate of change of the engine rotation speed DNE is lower than a negative value of a REGEN deducted determination engine rotation speed #DNRGNCUT based on DNE. The REGEN subtraction determination engine rotation speed #DNRGNCUT based on DNE is the rate of change DNE of the engine rotation speed NE, which is used as a basis for determining whether the generation amount is subtracted based on the rate of change DNE of the engine rotation speed NE.

When it is determined in step S066 that the reduction (rate of reduction) of the engine rotation number NE is high (YES), the flow proceeds to step S082. In step S082, the engine rotation speed increase flag at the time of determining the half-engaged clutch F_NERGNUP is set to "1" and the flow proceeds to step S085.

The engine rotation speed increase flag at the time of determining the half-engaged clutch F_NERGNUP is provided by the following reasons. Each time the engine rotation speed is increased when the clutch is in the half-engaged state, the determination in step S070, which is described later, often changes causing hunting. In order to prevent this hunting, the engine rotation speed is increased when the clutch is in the half-engaged state. Accordingly, the engine rotation speed increase flag F_NERGNUP is provided when the clutch is in the half-engaged state.

Based on the determination in Step S066, when the engine rotation speed NE is increased or when it is determined that reduction (rate of change) of the engine rotation speed is small (NO), the flow proceeds to step S067.

In step S067, it is determined whether the MT/CVT determination flag F_AT is "1". If the determination is "NO" (MT vehicle), the flow proceeds to step S079, and if the determination is "YES" (CVT), the flow proceeds to step S068.

In step S079, it is determined whether the half-engaged clutch determination flag F_NGRHCL is "1". When it is determined that the clutch is in the half-engaged state (YES), the flow proceeds to step S082. If it is determined that the clutch is not in the half-engaged state, the flow proceeds to step S080.

In step S080, the present gear position is compared with the previous gear position and it is determined from the comparison whether the gear position has been shifted up.

If the determination in step S080 indicates that the gear position is shifted (NO), the flow proceeds to step S082. When it the determined in step S080 indicates that the gear position is not shifted (YES), the flow proceeds to step S068. As described above, when the clutch is in the half-engaged state, the flow proceeds to step S082, and then the control mode is converted to the idle mode. The conversion to the idle mode is to prevent the engine from stalling, because the engine may stall if regeneration is performed when the clutch is in the half-engaged state.

In step S068, it is determined whether the engine rotation speed increase flag F_NERGNUP when the clutch is in the half-engaged state is "1". When the determination indicates that it is necessary to increase the engine rotation speed, and when the flag is set to "1" (YES), the flow proceeds to step S081, wherein an increasing rotation speed #DNERGNUP is added to the charging engine rotation speed lowest limit value #NERGNLx, which is set for each gear position. The value obtained by the above addition is set to the charging engine rotation speed lowest limit value #NERGNL, and the flow proceeds to step S070. When the determination in step S068 indicates that it is not necessary to increase the engine rotation speed in the determination when the clutch is the half-engaged state (NO), and when the flag is reset (=0), the flow proceeds to step S069, wherein the charging engine rotation speed lower limit value #NERGNLx, which is determined for each gear position, is set to the charging engine rotation speed lower limit #NERGNL and the flow proceeds to step S070.

In step S070, it is determined whether the engine rotation speed Ne is lower than the charging engine rotation speed lower limit value NERGNL. When the determination indicates that the rotation speed is low (NE≦NERGNL, YES), the flow proceeds to step S082. If the determination indicates that the rotation speed is high (NE>NERGNL, NO), the flow proceeds to step S071.

In step S057A, it is determined whether the scramble assist request flag F_MASTSCR is "1". This scramble assist is to improve a feeling of acceleration by temporarily increasing the assist amount at the time of acceleration. Basically, the scramble assist request flag F_MASTSCR is set to "1" when the changing amount of the throttle is large.

When the determination in step S057A is "NO", the flow proceeds to Step S057D after the REGENF processing is carried out in step S057B. When the determination in step S057A is "YES", the flow proceeds to step S058 after executing a subtraction processing of the final charging command value REGENF.

In step S057D, it is determined whether the REGENF processing flag F_ACCRGN at acceleration is "1". When the determination is "YES" (processing is executed), the flow process to step S058, and if the determination is "NO" (processing is not executed), the flow proceeds to step S057C.

In step S058, it is determined whether the final charging command value REGENF is "0". When the determination is "YES", the flow proceeds to the "acceleration mode" in step S059. In the "acceleration modey", the engine is assisted by the motor M and the flow proceeds to step S059A. When the result in step S058 is "NO", the control flow is completed.

In step S059A, it is determined whether the assist permission flag F_ACCAST is "1". When the result is "YES", the control is completed and when the result of determination is "NO", the flow proceeds to step S059B.

In step S059B, it is determined whether the start assist permission flag F_STRAST is "1". When the determination is "YES", the control is completed, and when the determination is "NO", the flow proceeds to step S059C.

In step S059C, it is determined whether the scramble assist permission flag F_SCRAST is "1". When the determination is "YES", the control is completed, and when the determination is "NO", the flow proceeds to step S059D.

In step S059D, it is determined whether the deactivated cylinder return assist permission flag F_RCSAST is "1". When the determination is "YES", the control is completed, and if the determination is "NO", the flow proceeds to step S063. Here, when the deactivated cylinder return assist permission flag F_RCSAST is "1", it means that the assist of the engine by the motor is permitted when the engine is converted from the all cylinders deactivated operation to the all cylinders activated (normal) operation.

In step S071, it is determined whether the vehicle speed VP is lower than the deceleration mode brake determination lower limit vehicle speed #VRGNBK. Note that this deceleration mode brake determination lower limit vehicle speed #VRGNBK is a value with hysteresis. When the determination indicates that the vehicle speed≦the deceleration mode brake determination lower limit vehicle speed #VRGNBK (YES), the flow proceeds to step S074. When the determination in step S071 indicates that the vehicle speed>the deceleration mode brake determination lower limit vehicle speed #VRGNBK (NO), the flow proceeds to step S072.

In step S072, it is determined whether the brake ON determination flag F_BKSW is "1". When the determination is "YES", the flow proceeds to step S073, and if the determination is "NO", the flow proceeds to step S074.

In step S073, it is determined whether the idle determination flag F THIDLMG is "1". If the determination is "NO" (the throttle is fully opened), the flow proceeds to step S078 for converting the mode to the "deceleration mode" in step S077A, the acceleration time REGEN processing is performed and the flow is completed. Note that the regeneration braking is performed by the motor M in the deceleration mode, and since the all cylinders deactivated operation is carried out in the deceleration mode, in this deceleration mode, regeneration energy is incremented corresponding to the decrease of the energy loss due to cylinder friction. When the determination in step S077A is "YES" (the throttle is not fully opened), the flow proceeds to step S074.

In step S074, it is determined whether the fuel cut flag F_FC is "1". This flag is determined as "1" for executing the fuel cut when the determination in step S078 is "1" indicating that the regeneration by the motor M is executed. When the determination in step S074 indicates that the vehicle is in the deceleration and the fuel cut mode ("YES"), the flow proceeds to step 078. If the determination in step S074 indicated that the vehicle is not in the deceleration and the fuel cut mode ("NO"), the flow proceeds to step S075, wherein the final subtraction processing of the final assist command value ASTPWRF is performed and then the flow proceeds to step S076.

In step S076, it is determined whether the final assist command value ASTPWRF is less than "0". When the result is "YES", the flow proceeds to "cruise mode" in step S077, and after executing the REGEN processing at the time of acceleration, the control is completed. In cruise mode, the motor does not operate, and the vehicle is driven only by the engine. In some cases, depending on the vehicle conditions, the motor is driven for regenerative operation or is driven as a generator for charging the battery 3.

If the determination in step S076 is "0", the control is competed.

All Cylinders Deactivated Operation Switching Execution Processing

An all cylinders deactivated operation switching execution processing is described below with reference to FIG. 6.

Here, the all cylinders deactivated operation means to drive engine while the intake valve and the exhaust valve of each cylinder are closed by the above-described variable valve timing mechanism when the vehicle is in deceleration regeneration, in order to increase regeneration—charts shown below, a periodical operations are carried out for setting and resetting the flag (all cylinders deactivated operation execution flag F_ALCS) for switching the driving operations between the all cylinders deactivated operation and the normal operation in which the engine is operated by the all cylinders activated operation. The above all cylinders deactivated operation execution flag F_ALCS executes the cylinder deactivation of the engine based on various flags, being described later, such as an all cylinders deactivated operation standby flag F_ALCSSTB, an all cylinders deactivated operation release condition formation flag F_ALCSSTB, and an all cylinders deactivated operation solenoid flag F_ALCSSOL, and also based on step S110, step S117, step S112, and step S119. That is, the all cylinders deactivated operation execution flag F_ALCS constitutes a cylinder control device.

In step S101, it is determined whether designated F/Ss (fail safe) are detected. If the determination is "NO", the flow proceeds to step S102, and when the result is "YES", the flow proceeds to step S114. This is because the cylinder deactivation drive must not be executed if there is some anomalous state.

In step S102, it is determined whether the all cylinders deactivated operation is executed by determining whether the all cylinders deactivated operation execution flag F_ALCS is "1". The all cylinders deactivated operation execution flag F_ALCS is determined in this flow-chart, and when the flag value is "1", the all cylinders deactivated operation is under execution, if the flag value is "0", the all cylinders deactivated operation is not executed and the normal operation is executed.

When the determination in step S102 is "YES" and when the all cylinders deactivated operation is under execution, the flow proceeds to step Si05. Thus, when it is determined that the all cylinders deactivated operation is under execution (F_ALCS=1) by determination of conditions before executing the all cylinders deactivated operation, which will be described later, conditions before the all cylinders deactivated operation are not determined. If the determination in step S102 is "NO", and if the all cylinders deactivated operation is not executed, the flow proceeds to step S103, wherein conditions before executing the all cylinders deactivated operation (F_ALCSSTB_JUD), which will be described later, are determined. In step S104, the all cylinders deactivated operation is executed only when the conditions before executing the all cylinders deactivated operation are satisfied.

In step S104, it is determined whether the all cylinders deactivated operation standby flag F_ALCSSTB (determination before executing the cylinder deactivated operation) is "1". This standby flag is determined as "1" when the conditions before execution are satisfied in step S103, and this flag is determined as "0" when the conditions as are not satisfied. This standby flag determines whether or not the all cylinders deactivated operation is executed in accordance with the driving conditions of the vehicle. When the determination in step S104 is "YES", indicating that the conditions before executing the all cylinders deactivated operation is satisfied, the flow proceeds to step S105. If the determination in step S104 is "NO", the flow proceeds to step S114 because the conditions for executing the deactivated operation are not satisfied.

In step S105, the all cylinders deactivated operation release conditions (F_ALCSSTP_JUD) are determined and the flow proceeds to step S106. When the release conditions are satisfied by the all cylinders deactivated release determination device, the all cylinders deactivated operation will not be conducted. This all cylinder deactivated operation release determination is always performed in the processing shown in FIG. 6, in contrast to the determination of the conditions before executing the all cylinders deactivated operation.

In step S106, it is determined whether the determination flag of conditions before executing the all cylinder deactivated operation conditions F_ALCSSTP (a cylinder deactivated release determination device) is "1". This flag value will be "1" when the release conditions are satisfied from the determination in step S105, and the flag value will be "0" when the release conditions are not satisfied. It is determined by this flag whether the all cylinders deactivated operations are released. When the determination in step S106 is "YES" indicating that the release conditions are satisfied, the flow proceeds to step S114. If the determination in step S106 is "NO," that is, if the release conditions are not satisfied, the flow proceeds to step S107.

In step S107, the above-described solenoid OFF delay timer for the spool valve SV, TALCSDLY 2, is set to a predetermined value #TMALCS2, and the flow proceeds to step S108. This step is conducted in order to secure a certain period of time until the solenoid for the spool valve SV is turned OFF in step S116, which will be described later, after the determination in step S105 is completed when the engine is switched from the all cylinders deactivated operation to the normal operation.

In step S108, it is determined whether a solenoid ON delay timer TALCSDLY1 (predetermined time), which will be described later, is "0". When the determination is "YES", that is, when a certain time has elapsed, the flow proceeds to step S109. When the determination in step S108 is "NO", that is, when a certain time has not elapsed, the flow proceeds to step S116.

In step S109, a solenoid flag for the all cylinders deactivated operation F_ALCSSOL is set to "1 " (solenoid of the spool valve SV for the all cylinders deactivated operation is ON) and the flow proceeds to step S110. This solenoid flag for the all cylinders deactivated operation F_ALCSSOL constitutes one of the deactivated operation execution device for operating the solenoid valve for executing the deactivated operation of the engine.

In step S110, it is determined by the hydraulic pressure sensor whether the hydraulic pressure is actually generated by turning ON the operation of the solenoid for the all cylinders deactivated operation. In practice, it is determined whether the hydraulic pressure POIL is higher than the all cylinder deactivated operation execution determination hydraulic pressure #POILCSH (for example, 137 kPa (=14.7 kg/cm$^2$)). When the determination is "YES", that is, when the hydraulic pressure is sufficiently high, the flow proceeds to step S111. If the determination is "NO" (the value has hysteresis), the flow proceeds to step S118. Note that an hydraulic pressure switch may also be used in this step instead of the hydraulic pressure sensor. The above-described step S110 constitutes one of the operation appropriateness determination device for determining appropriateness of the operation of the spool valve SV.

In step S111, it is determined whether the all cylinders deactivated operation execution delay timer TCSDLY1 (predetermined time) for securing a period of time until the hydraulic pressure is applied after the spool valve SV is turned ON. When the determination is "YES", the flow proceeds to step S112. If the determination is "NO", the flow proceeds to step S120.

In step S112, a timer value #TMOCSDL2 is obtained by retrieving a table based on the oil temperature measured by the oil temperature sensor TOIL, and the all cylinders deactivated operation release delay timer TCSDLY2 (predetermined time) is set. This setting is conducted because the oil temperature causes a delay in the operation speed, that is, when the oil temperature is low, it takes time for the oil pressure to reach a predetermined oil pressure. Accordingly, this timer value #TMOCSDL2 becomes longer as the oil temperature decreases. This step S112 constitutes an operation appropriateness determination device for determining appropriateness of the operation of the spool valve SV.

In step S113, the all cylinders deactivated operation execution flag F_ALCS is set to "1", and the control is completed. Note that in step S112, the engine cooling water temperature may be obtained by the table retrieval for setting the timer value instead of the oil temperature.

In step S114, the solenoid ON delay timer of the spool valve SV TALCSDLY1 is set to a predetermined value #TMALCS1, and the flow proceeds to step S115. The reason for setting this step is that, when the engine driving mode is switched from the normal operation to the all cylinders deactivated operation, it is necessary to secure a certain period of time until the solenoid of the spool valve is turned ON in step S109 after the determination in step S105 has been completed.

In step S115, it is determined whether the solenoid OFF delay timer TALCSDLY2 is "0". When the determination in step S115 is "YES" indicating that a certain time has elapsed, the flow proceeds to step S116, and when the determination in step S115 is "NO", indicating that a certain time has not elapsed, the flow proceeds to step S109.

In step S116, the solenoid flag for the all cylinders deactivated operation F_ALCSSOL is set to "1" (solenoid of the spool valve SV for the all cylinder deactivated operation is turned OFF), and the flow proceed to step S117.

In step S117, it is determined by the hydraulic pressure sensor whether the hydraulic pressure is actually released by the OFF operation of the solenoid for releasing the all cylinder deactivated operation. In practice, it is determined whether the hydraulic pressure POIL is lower than the release determination hydraulic pressure #POILCSL of the all cylinders deactivated operation (for example, 98 kPa (=1.0 kg/cm$^2$)). When the determination is "YES" indicating that the hydraulic pressure is in the low pressure side, the flow proceeds to step S118. If the determination is "NO", that is the pressure (having hysteresis) is in the higher side, the flow proceeds to step S111. Note that a hydraulic pressure switch may also be used in this step instead of the hydraulic pressure sensor. The above-described step S117 constitutes one of the operation appropriateness determination device for determining appropriateness of the operation of the spool valve SV.

In step S118, it is determined whether the all cylinders deactivated operation delay timer TCADLY2 is "0" in order to secure the time until the hydraulic pressure is actually released after the spool valve SV is turned OFF. When the determination is "YES", the flow proceeds to step S119. If the determination is "NO", the flow proceeds to step S113.

In step S119, the timer value #TMOCSDL1 is retrieved from the table in accordance with the oil temperature TOIL obtained by the oil temperature sensor, and the all cylinders deactivated operation execution delay timer TCSDLY1 is set. This is because the oil temperature affects on the operation speed such that when the oil temperature is low, it takes time to reach a predetermined oil pressure. Therefore, this timer value #TMOCSDLY1 becomes greater as the oil temperature TOIL decreases. This step S119 constitutes one of the operation appropriateness determination devices of the spool valve SV.

The control operation is then completed after the all cylinders deactivated operation execution flag F_ALCS is set to "0" instep S120. Note that, in step 119, it is possible to retrieve the timer value based on the engine water temperature instead of the oil temperature.

Figure 6:
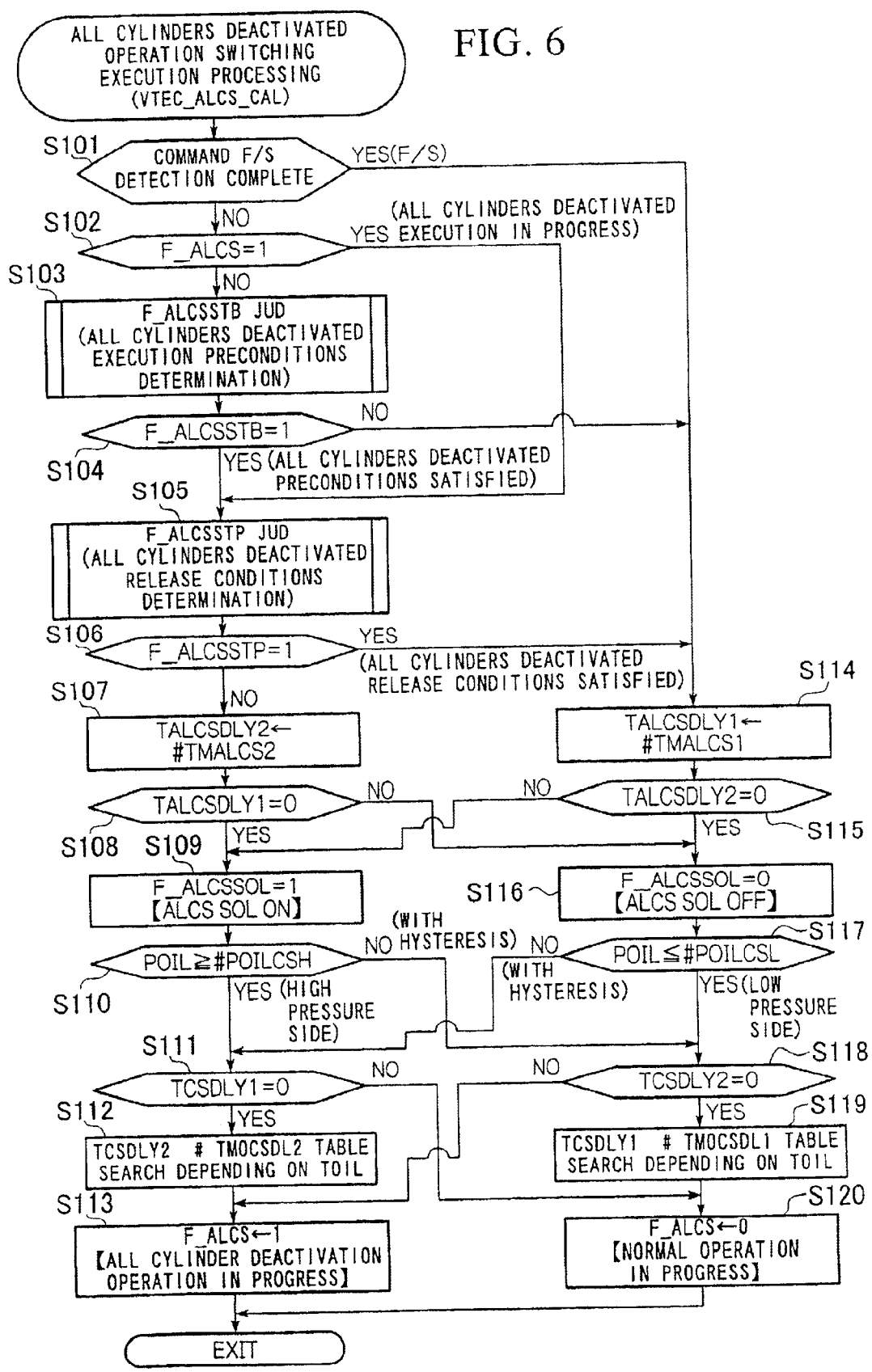
FIG. 6 is a flow-chart showing an all cylinders deactivated driving switch execution processing according to one embodiment of the present invention.
Figure 7:
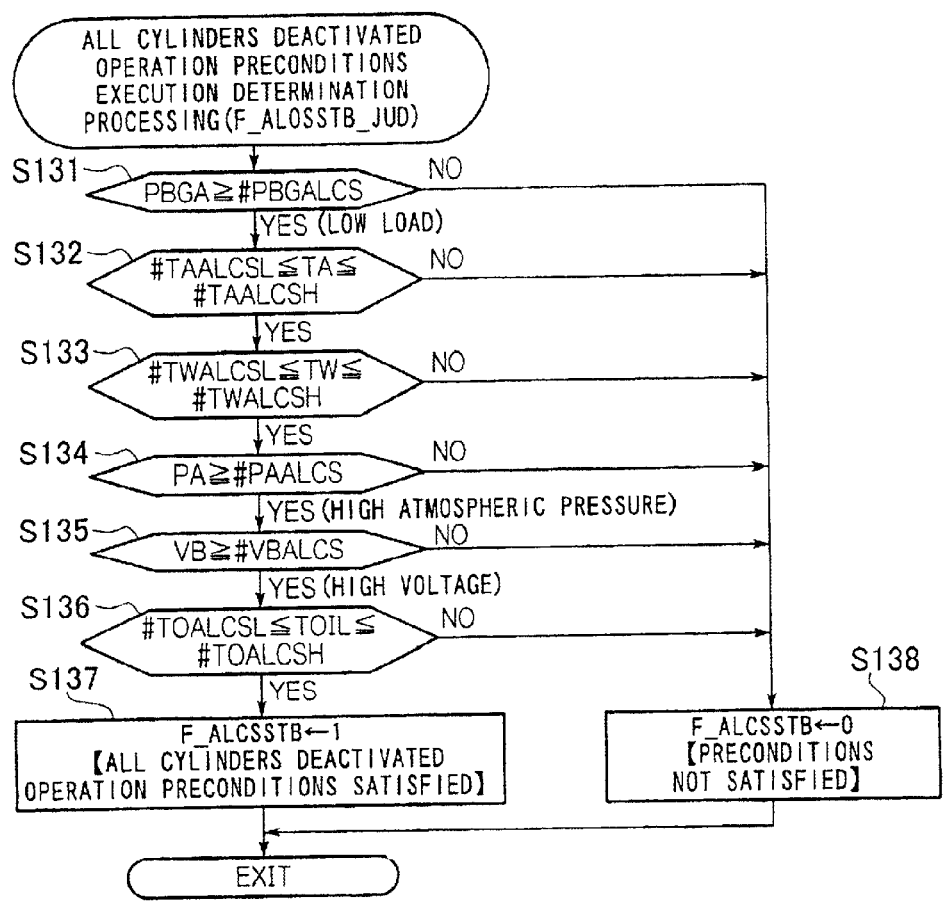
FIG. 7 is a flow-chart showing an all cylinders deactivated previous condition execution determination processing according to one embodiment of the present invention.

Determination Processing of Conditions Before Executing All Cylinder Deactivated Operation The conditions determination processing before the all cylinder deactivated operation in step S103 in FIG. 6 is described below in detail with reference to FIG. 7. Note that this processing is repeated at predetermined intervals.

In step S131, it is determined whether the suction pipe pressure PBGA is higher than the all cylinders deactivated operation execution upper limit pressure #PBGALCS (for example, −40 kPa (=−300 mmHg)). This determination is executed because it is not preferable to execute the all cylinders deactivated operation when the engine load is high. When the determination in step S131 is "YES" (low load), the flow proceeds to step S132, and if the determination is "NO", the flow proceeds to step S138.

In step S138, the all cylinders deactivated operation is not executable, so that the all cylinders deactivated operation standby flag F_ALCSSTB is set to "0", and the control is completed.

In step S132, it is determined whether the outside air temperature is within a predetermined temperature range (the all cylinders deactivated operation execution lower limit outside air temperature #TAALCSL (for example, 0° C.)≦TA≦the all cylinders deactivated operation upper limit outside air temperature #TAALCSH (for example, 50° C.). When it is determined in step S132 that the outside air temperature is within the predetermined range, the flow proceeds to step S133. If the determination is that the outside temperature is not within the predetermined range, the flow proceeds to step S318. When the outside air temperature TA is below all the cylinders deactivated operation execution lower limit outside temperature #TAALCSL, or when the outside air temperature is above the all cylinders deactivated operation execution upper limit outside temperature #TAALCSH, the engine operation will become unstable as a result of the all cylinders deactivated operation.

In step S133, it is determined whether the cooling water temperature is within a predetermined temperature range (the all cylinders deactivated operation execution lower limit cooling water temperature #TWALCSL (for example, 50° C.)≦TW≦the all cylinders deactivated operation upper limit cooling water temperature #TWALCSH (for example, 100° C.). When it is determined in step S135 that the cooling water temperature is within the predetermined temperature range, the flow proceed to step S134, and when the determination is "NO", the flow proceeds to step S138. This determination is executed because when the cooling water temperature is below the all cylinders deactivated operation execution lower limit cooling water temperature #TWALCSL or when the cooling water temperature is above the all cylinders deactivated operation upper limit cooling water temperature #TWALCSH, the engine operation becomes unstable due to the all cylinders deactivated operation.

In step S134, it is determined whether the atmospheric pressure is above the all cylinders deactivated operation execution upper limit atmospheric pressure #PAALCS (for example, 77.3 kPa (=580 mmHg)). It the determination in step S134 is "YES"(higher atmospheric pressure), the flow proceeds to step S135. If the determination in step S134 is "NO", the flow proceeds to step S138, because it is not desirable to execute the all cylinders deactivated operation when the atmospheric pressure is low (for example, since the power pressure of the brake master cylinder will not be secured when the brake is turned ON).

In step S135, it is determined whether the voltage VB of the 12V auxiliary battery 4 is above the all cylinders deactivated operation execution upper limit voltage #VBALCS (for example, 10.5V). When the determination is "YES" (the voltage is above the limit), the flow proceeds to step S136, and when the determination is "NO", the flow proceeds to step S138. This determination is executed because if the voltage VB of the 12V auxiliary battery 4 is below the predetermined voltage, the responsiveness of the spool valve SV becomes degraded. In other words, this determination is a counterstep for the voltage drop of the battery at low temperature or for the battery degradation.

In step S136, it is determined whether the oil temperature TOIL is within a predetermined range (the all cylinders deactivated operation execution lower limit oil temperature #TOALCSL (for example, 70° C.)≦TOIL≦the all cylinders deactivated operation upper limit oil temperature #TOALCSH (for example, 100° C.)). When it is determined in step S136 that the oil temperature TOIL is within the predetermined range, the flow proceeds to step S137. When the oil temperature is not within the predetermined range, the flow proceeds to step S138. This determination is executed because the responsiveness of switching between the normal engine operation and the all cylinders deactivated operation becomes unstable when the oil temperature is below the all cylinders deactivated operation execution lower limit oil temperature #TOALCSL or when the oil temperature TOIL exceeds the all cylinders deactivated operation execution upper limit oil temperature #TOALCSH.

In step S137, since it is possible to execute the all cylinders deactivated operation, the all cylinders deactivated operation standby flag F_ALCSSTB is set to "1" and the control is completed.

Determination Processing of Conditions for Releasing the All Cylinders Deactivated Operation The determination processing of conditions for releasing the all cylinders deactivated operation in step S105 in FIG. 6 will be described in detail with reference to FIG. 8. Note that this processing is repeated at predetermined intervals.

In step S141, it is determined whether the fuel cut flag F_FC is "1". When the determination instep S141 is "YES", the flow proceeds to step S142. If the determination is "NO", the flow proceeds to step S157. This determination is conducted because the all cylinders deactivated operation is carried out for the purpose of reducing the friction of the engine at the time of deceleration fuel cut and to recover the reduced friction energy as an increase of the regeneration energy.

In step S157, the conditions for releasing the all cylinders deactivated operation is satisfied so that the all cylinder deactivated operation release condition materialization flag F_ALCSSTP is set to "1" and the control is completed.

In step S142, it is determined whether the deceleration regeneration is executed. When the determination in step S142 is "YES", the flow proceeds to step S143, and if the result is "NO", the flow proceeds to step S157.

In step S143, it is determined whether the MT/CVT determination flag F_AT is "1". If the determination is "NO" (MT vehicle), the flow proceeds to step S144. When the determination is "YES" (AT/CVT vehicle), the flow proceeds to step S155.

In step S155, it is determined whether the in-gear determination flag F_ATNP is "1". If the determination is "NO" (in-gear), the flow proceeds to step S156. When the determination is "YES" (N/P range), the flow proceeds to step S157.

In step S156, it is determined whether the reverse position determination flag F_ATPR is "1". When the determination is "YES" (reverse position), the flow proceeds to step S157. If the determination is "NO" (not reverse position), the flow proceeds to step S146.

The all cylinders deactivated operation is released when the gear is in the N/P range or in the reverse position by the determinations in steps 155 and 156.

In step S144, it is determined whether the previous gear position is in the higher gear position (Hi (High) gear side) than the all cylinders deactivated operation continuation lower limit gear position #NGRALCS (for example, the third gear position including this position). When the determination is "YES" (Hi (high) gear side), the flow proceeds to step S145, and if the determination is "NO", the flow proceeds to step S157. This determination is executed in order to prevent reduction of the regeneration efficiency at low gear position and to prevent frequent switching between the normal operation and the deactivated operation in the traffic congestion.

In step S145, it is determined whether the half-engaged clutch determination flag F_NGRHCL is "1". When the determination is "YES" (half-engaged clutch), the flow proceeds to step S157, and if the determination is "NO", the flow proceeds to step S156. Accordingly, it is possible to prevent the unnecessary cylinder deactivated operations which may cause the engine to stall when the gear is in the half-engaged state for the vehicle stop or which may cause inability to respond to the driver's intention to accelerate the vehicle in the case of the half-engaged clutch at the time of acceleration.

In step S146, it is determined whether the changing rate of the engine rotation speed DNE is below a negative value (for example, −100 rpm) of the upper limit engine rotation speed changing rate #DNEALCS for continuously executing the all cylinders deactivated operation. When the determination is "YES" (the changing rate of the engine rotation speed is high), the flow proceeds to step S157, and if the determination is "NO", the flow proceeds to step S148. This determination is conducted in order to prevent the engine stall when the reduction rate of the engine rotation speed is high.

In step S148, it is determined whether the vehicle speed VP is within a predetermined range (an all cylinders deactivated operation continuation execution lower limit vehicle speed #VPALCSL (for example, 10 km/h)≦VP≦ an all cylinders deactivated operation continuation execution upper limit vehicle speed #VPALCSH (for example, 60 km/h)). When it is determined in step S148 that the vehicle speed is within the predetermined range, the flow proceeds to step S149. When the vehicle speed is not in the predetermined range, the flow proceeds to step S157. When the vehicle speed is below the an all cylinders deactivated operation continuation execution lower limit #VPALCSL, or when the vehicle speed is above the all cylinders deactivated operation continuation execution upper limit #VPALCSH, the all cylinders deactivated operation is released.

In step S149, it is determined whether the engine rotation speed NE is within a predetermined range (an all cylinders deactivated operation continuation execution lower limit engine rotation speed #NALCSL (for example, 800 rpm) ≦NE≦ an all cylinders deactivated operation continuation execution upper limit engine rotation speed #NALCSH (for example, 3000 rpm)). When it is determined in step S149 that the engine rotation speed NE is within the predetermined range, the flow proceeds to step S150. When it is determined that the engine rotation speed is not in the predetermined range, the flow proceeds to step S157. When the engine rotation speed is below the all cylinders deactivated operation continuation execution lower limit engine rotation speed #NALCSL, or when the engine rotation speed NE is higher than the all cylinders deactivated operation continuation execution upper limit engine rotation speed #NALCSH, the all cylinders deactivated operation is released. When the engine rotation speed NE is below the all cylinders deactivated operation continuation execution lower limit engine rotation speed #NALCSL, the regeneration efficiency may be reduced or the hydraulic pressure for switching the all cylinders deactivated operation may becomes too low. In contrast, when the engine rotation speed is too high, the hydraulic pressure may become too high to switch the all cylinders deactivated operation, or the oil consumption for operating the deactivated operation of the engine may becomes too high.

In step S150, it is determined whether the negative pressure in the brake master power cylinder MPGA is above the all cylinders deactivated operation continuation execution upper limit negative pressure #MPALCS (for example, −26.7 kPa (=−200 mmHg). When it is determined in step S150 that the negative pressure of the brake master power cylinder MPGA is above the all cylinders deactivated operation continuation execution upper limit negative pressure #MPALCS, which is closer to the atmospheric pressure (MPGA≧#MPACLS, YES), the flow proceeds to step S151. When it is determined in step S150 that the negative pressure of the brake master power cylinder MPGA is below the all cylinders deactivated operation continuation execution upper limit negative pressure #MPALCS (MPGA<#MPFCMG, NO), the flow proceeds to step S157. This determination is executed because it is not preferable to continue the all cylinders deactivated operation when the negative pressure of the brake master power cylinder MPGA is not sufficient.

In step S151, it is determined whether the remaining battery charge QBAT is within a predetermined range (an all cylinders deactivated operation continuation execution lower limit remaining battery charge #QBALCSL (for example, 30%)≦QBAT≦ an all cylinders deactivated operation continuation execution upper limit remaining battery charge #QBALCSH (for example, 80%)). When it is determined in step S151 that the remaining battery charge is within the predetermined range, the flow proceeds to step S152. When the remaining battery charge QBAT is not within the predetermined range, the flow proceeds to step S157. This determination is executed because if the remaining battery charge QBAT is below the lower limit #QBALCSL for continuously executing the all cylinders deactivated continuation or if the remaining battery charge is above the upper limit #QBALCSH for continuously executing the all cylinders deactivated continuation, the all cylinders deactivated operation is released. When the remaining battery charge QBAT is too low, the motor may not be able to obtain sufficient energy for assisting the engine drive. In contrast, when the remaining battery charge is too high, the kinetic energy of the vehicle may not be recovered by regeneration.

In step S152, it is determined whether an IDLE determination flag F_THIDLMG is "1". When the determination is "YES" (not fully closed), the flow proceeds to step S157. If the determination is "NO" (fully closed), the flow proceeds to step S153. This determination is carried out in order to improve drivability by releasing the all cylinders deactivated operation when the throttle is opened even a small amount from the fully closed state.

In step S153, it is determined whether the engine oil pressure POIL is higher than the lower limit oil pressure for continuously executing the all cylinder deactivated operation #POALCS (for example, 98 to 137 kPa (1.0 to 1.4 kg/cm) with hysteresis). When the determination is "YES", the flow proceeds to step S154, and when the determination is "NO", the flow proceeds to step S157. This determination is made because when the engine oil pressure POIL is lower than the lower limit oil pressure for continuously executing the all cylinder deactivated operation #POALCS, and it is not possible to ensure the oil pressure for executing the deactivated cylinder operation (for example, the oil pressure for operating the spool valve SV).

In step S154, since conditions for releasing the all cylinders deactivated operation is not satisfied, the all cylinders deactivated release conditions realization flag F_ALCSSTP is set to "0", and the control ends.

Fuel Cut Execution Determination Processing

Next, the fuel cut execution determination processing will be explained with reference to FIG. 9. Note that this processing is repeated at a predetermined cycle.

Normally, having as objects engine protection and improvement of fuel efficiency, in the case in which constant conditions are satisfied, a fuel cut is carried out. However, in the determination processing of whether or not to carry out this fuel cut, conditions related to all cylinders deactivation are added.

In step S201, the high rotation speed fuel cut execution determination processing is carried out, and the flow proceeds to step S202. This is a fuel cut carried out for engine protection in the case in which the engine is rotating at high speed (for example, the engine rotation speed NE is equal to or greater than 620 rpm), and in this processing, setting and resetting of the high rotation fuel cut flag F_HNFC are carried out.

In step S202, it is determined whether or not the high rotation speed fuel cut flag F_HNFC is 1. In the case in which the result of the determination is "YES" (high rotation speed fuel cut satisfied), the flow proceeds to step S212, and in the case in which the result of the determination is "NO", the flow proceeds to step S203.

In step S212, (the fuel supply stop device), the fuel cut flag F_FC is set to 1, and the control ends. Moreover, in the case in which the fuel cut flag F_FC is 1, fuel injection is not carried out.

In step S203, high velocity fuel cut execution determination processing is carried out, and the flow proceeds to step S204. This is a fuel cut that is carried out from the view point of velocity restriction in the case in which the vehicle is traveling at a high velocity (for example, 180 km/h or greater), and in this processing, the setting and resetting of the high vehicle speed fuel cut flag F_HVFC are carried out.

In step S204, it is determined whether or not the high vehicle speed fuel cut flag F_HVFC is 1. When the determination is 1 (high vehicle speed fuel cut satisfied), the flow proceeds to step S212, and in the case in which the result of the determination is NO, the flow proceeds to step S205.

In step S205, deceleration fuel cut execute determination processing is carried out, and the flow proceeds to step S206. This is a fuel cut carried out in order to improve fuel efficiency in the case in which the vehicle is decelerating, and in this processing, the setting and resetting of the deceleration fuel cut flag F_FC are carried out.

In step S206, it is determined whether the fuel cut flag F_FC is "1". When the determination is "YES", the flow proceeds to step S212. If the result of the determination is "NO", the flow proceeds to step S207. Moreover, in the case that the deceleration mode is entered and the fuel cut flag F_FC becomes "1", the fuel cut is carried out.

In step S207, it is determined whether or not the all cylinders deactivation execution flag F_ALCS is "1". When the determination is "YES" (all cylinders deactivated operation in progress), the flow proceeds to step S212, and if the determination is "NO", the flow proceeds to step S208.

In step S208, it is determined whether or not the all cylinders deactivated solenoid flag F_FALCSSOL is "1". When the determination is "YES" (the all cylinder deactivation solenoid is ON), the flow proceeds to step S212. If the determination is "NO", the flow proceeds to step S209.

Therefore, when the all cylinders deactivated operation (F_ALCS=1) is in progress, and the intake valve and the exhaust valve are closed (step S207), and when the all cylinders deactivated solenoid flag F_ALCSSOL is "1" (step S208), the fuel cut is continued.

In addition, when the engine returns from the all cylinders deactivated operation to the normal operation, even if the all cylinders deactivation execution flag F_ALCS becomes "0" the all cylinders deactivated solenoid flag F_ALCSSOL is "0". That is, since all cylinders possibly remain in the deactivated state even when the engine is reactivated if the all cylinders deactivated operation execution flag becomes "0" until the all cylinders deactivated solenoid is OFF and the all cylinders are completely reactivated, and thus the determination according to the all cylinders deactivated solenoid flag F_ALCSSOL in step S208 is added, and in the case that the all cylinders solenoid flag F_ALCSSOL becomes "0", the fuel cut is released (F_FC=0).

In step S209, the fuel cut flag F_FC is set to 0, the fuel cut is released, and the control ends.

Engine Rotation Speed Increase Signal Determination Processing for CVT Vehicles

Figure 10:
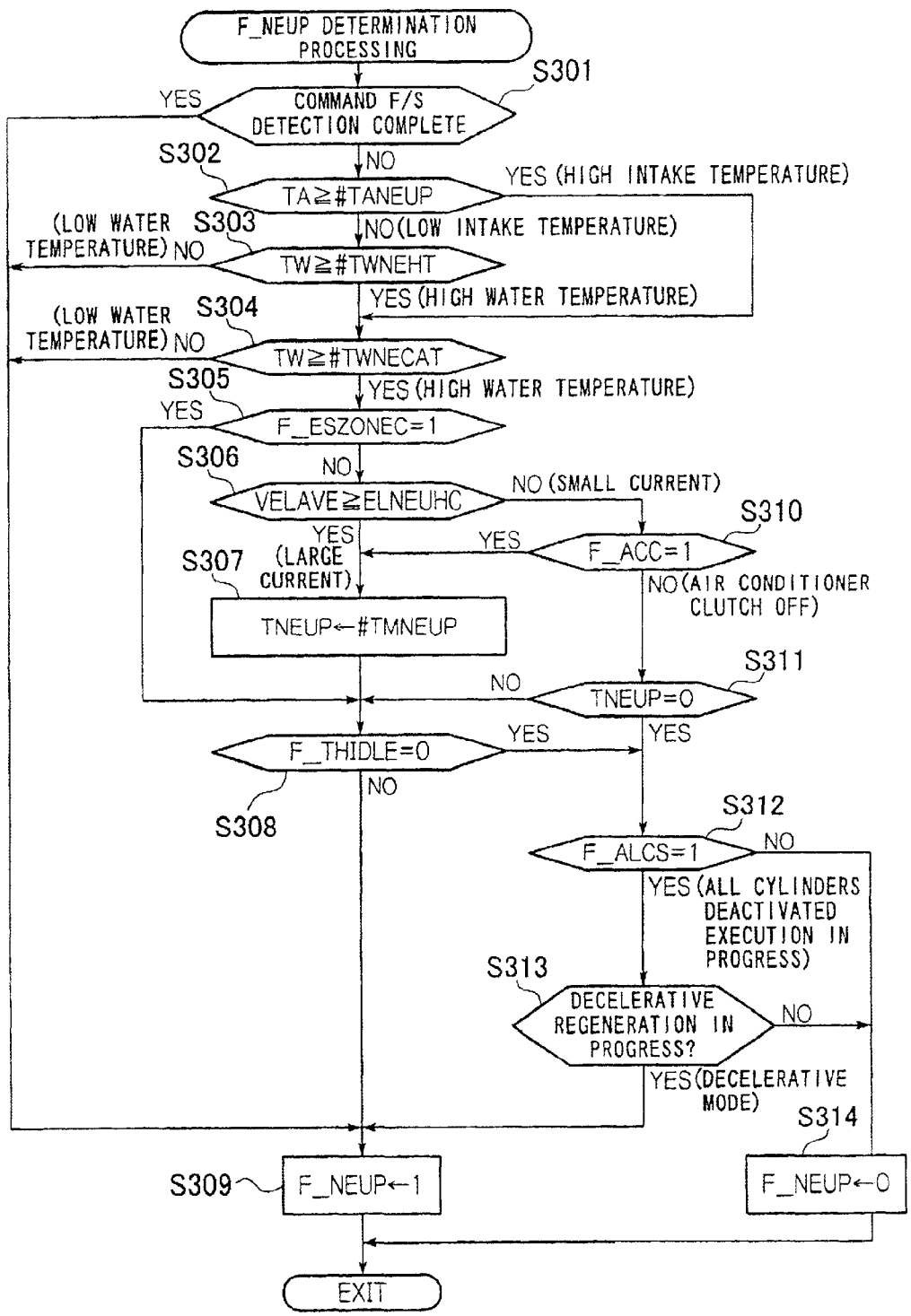
FIG. 10 is a flow-chart showing an engine rotation speed increase determination processing for a CVT vehicle according to the present invention.

Next, the engine rotation speed increase signal determination processing for a CVT vehicle will be explained while referring to FIG. 10.

In a CVT vehicle, in the case that constant conditions are satisfied, processing to increase the engine rotation speed NE is carried out, but during this processing, conditions related to all cylinders deactivated operation are added. Specifically, during all cylinder deactivated operation, as explained above, the friction of the engine E decreases, and the amount of regeneration can be increased by an amount equivalent to this decrease. In this case, regeneration due to high torque acts as a cause of heat generation in the electric motor, and thus the heat load on the electric motor is decreased by increasing the rotation speed (of the input axle) of the CVT, that is, the engine rotation speed NE. At the same time, the amount of regeneration is increased.

Figure 11:
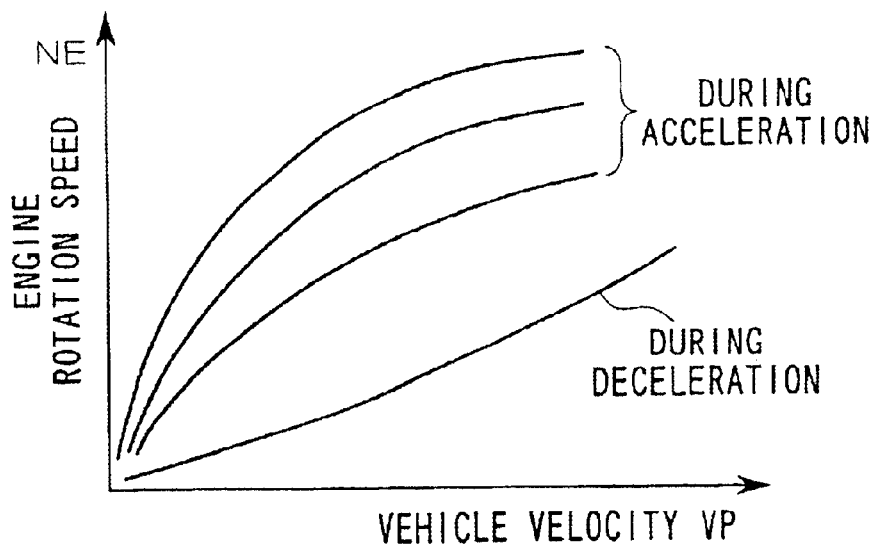
FIG. 11 is a flow-chart showing a relationship between the vehicle speed of a CVT vehicle and an engine rotation speed according to the present invention.

Concretely, in this flowchart, the setting and resetting of the engine rotation speed increase flag F_NEUP is carried out. When "1" is set in the engine rotation speed increase flag F_NEUP, the engine rotation speed NE increases. When the engine rotation speed increase flag F_NEUP is set to 0, a map value of a normal throttle OFF is read. As shown in FIG. 11, in a CVT vehicle during acceleration for similar vehicle speed in each range, a map is used that increases the engine rotation speed depending on the degree of the throttle opening. In contrast, during deceleration, because a single throttle OFF map is used for the vehicle speed, an engine rotation speed NE determined by the vehicle speed VP is set, and the engine rotation speed NE is lowered depending on the lowering of the vehicle speed VP. Specifically, in the case that the engine rotation speed increase flag F_NEUP is set, the throttle OFF map during deceleration is raised by a predetermined amount. Note that, in order to prevent high torque regeneration, it is preferable to increase the increase amount in proportion to the decrease in the velocity.

In this manner, even when the all cylinders deactivated operation is carried out, the driver can feel the same deceleration feelings by increasing the engine rotation speed. Moreover, it is also possible to decrease only the torque applied to the electric motor, by not increasing the amount of regeneration.

In step S301, it is determined whether the designated F/S (failsafe) detection is complete. When the determination is "NO", the flow proceeds to step S302, and if the determination is "YES", the flow proceeds to step S309. In step S309, control is ended by setting the engine rotation speed increase signal determination flag F_NEUP to 1. When some sort of abnormality occurs, the engine rotation speed is increased and the battery is charged in order to make the vehicle tend to be more stably driven.

In step S302, it is determined whether the intake air temperature TA (identical to the exterior air temperature) is equal to or greater than the engine rotation speed increase requirement determination intake temperature #TANEUP. When the determination is "YES" (high intake temperature), the flow proceeds to step S304, and if the determination is "NO" (low intake temperature), the flow proceeds to step S303.

In step S303, it is determined whether the cooling water temperature TW is equal to or greater than the engine rotation speed increase required determination heater cooling water temperature #TWNEHT. When the determination is "YES" (high water temperature), the flow proceeds to step S304, and if the determination is "NO" (low water temperature), the flow proceeds to step S309.

The processing in step S302 and step S303 is performed because it is necessary to increase the engine rotation speed due to the requirements of the heater to guarantee the heater capacity when the external air temperature TA and the cooling water temperature TW are low.

In step S304, it is determined whether the cooling water temperature TW is equal to or greater than the engine rotation speed increase requirement determination catalyzer cooling water temperature #TWNEHT. When the determination is "YES" (high water temperature), the flow proceeds to step S305, and if the determination is "NO" (low water temperature), the flow proceeds to step S309. Even when it is determined that the intake temperature is high, the engine rotation speed NE is increased to rapidly increase the temperature of the catalyzer in order to ensure that the temperature of the catalyzer remains in the low emission region.

In step S305, it is determined whether or not the energy storage zone C flag F_ESZONEC is "1". In this zone, a flag is set when the remaining battery charge QBAT is, for example, equal to or less than 20%. When the determination is "YES", the flow proceeds to step S308, and if the determination is "NO", the flow proceeds to step S306. When the remaining battery charge is low, in step S308, which is described below, assuming that the throttle is open, it is necessary to raise the engine rotation speed NE and increase the remaining battery charge QBAT.

In step S306, it is determined whether the average current consumption VELAVE of the auxiliary battery 4 is equal to or greater than the current consumption threshold #ELNEUHC (value with hysteresis). When the determination is "YES" (high current), the flow proceeds to step S307, and if the determination is "NO" (low current), the flow proceeds to step S310.

Even if the remaining battery charge QBAT is sufficient, when the average current consumption VELAVE is equal to or greater than the current consumption threshold #ELNEUHC, which is described below, assuming that the throttle is open in step S308, it is necessary to increase the efficiency of power generation by raising the engine rotation speed NE in step S309.

In step S307, the engine rotation speed increase timer TNEUP is set to the timer value #TMNEUP, and the flow proceeds to step S408.

In step S308, it is determined whether the idle determination flag F_THIDLE is "0". When the determination is YES (the throttle is closed), the flow proceeds to step S312. If the determination is "NO" (the throttle is open), the flow proceeds to step S309.

In step S310, it is determined whether the air conditioner ON flag F_ACC is 1. When the determination is "YES" (the air conditioner clutch is ON), the flow proceeds to step S307, and if the determination is "NO", (the air conditioner clutch is OFF), the flow proceeds to step S311. When the air conditioner is ON, it is necessary to increase the output because, for example, the feeling of acceleration is guaranteed by raising the engine rotation speed.

In step S311, it is determined whether the engine rotation speed increase timer TNEUP is "0". When the determination is "YES", the flow proceeds to step S312, and if the examination is "NO", the flow proceeds to step S308. This step is used for ensuring a constant time interval in proceeding to the determination processing (step S312 and step S313) related to the all cylinders deactivated operation, which is described below.

In step S312, it is determined whether the all cylinders deactivated operation execution flag F_ALCS is 1. When the determination is "YES" (the all cylinders deactivated operation is in progress), the flow proceeds to step S313, and if the determination is "NO" (the normal operation is in progress), the flow proceeds to step S314. In step S314, the engine rotation speed increase signal determination flag F_NEUP is set to "0", and the control ends. In this case, the engine rotation speed NE is not increased.

In step S313, it is determined whether the deceleration regeneration is in progress. When the determination is "YES" (deceleration mode), the flow proceeds to step S309, and if the determination is "NO" (other than deceleration mode), the flow proceeds to step S314.

By step S312 and step S313, during all cylinders deactivated operation and during deceleration regeneration, even if the throttle is closed, increase of the engine rotation speed NE increases the amount of regeneration.

Next, the operation will be explained.

Figure 8:
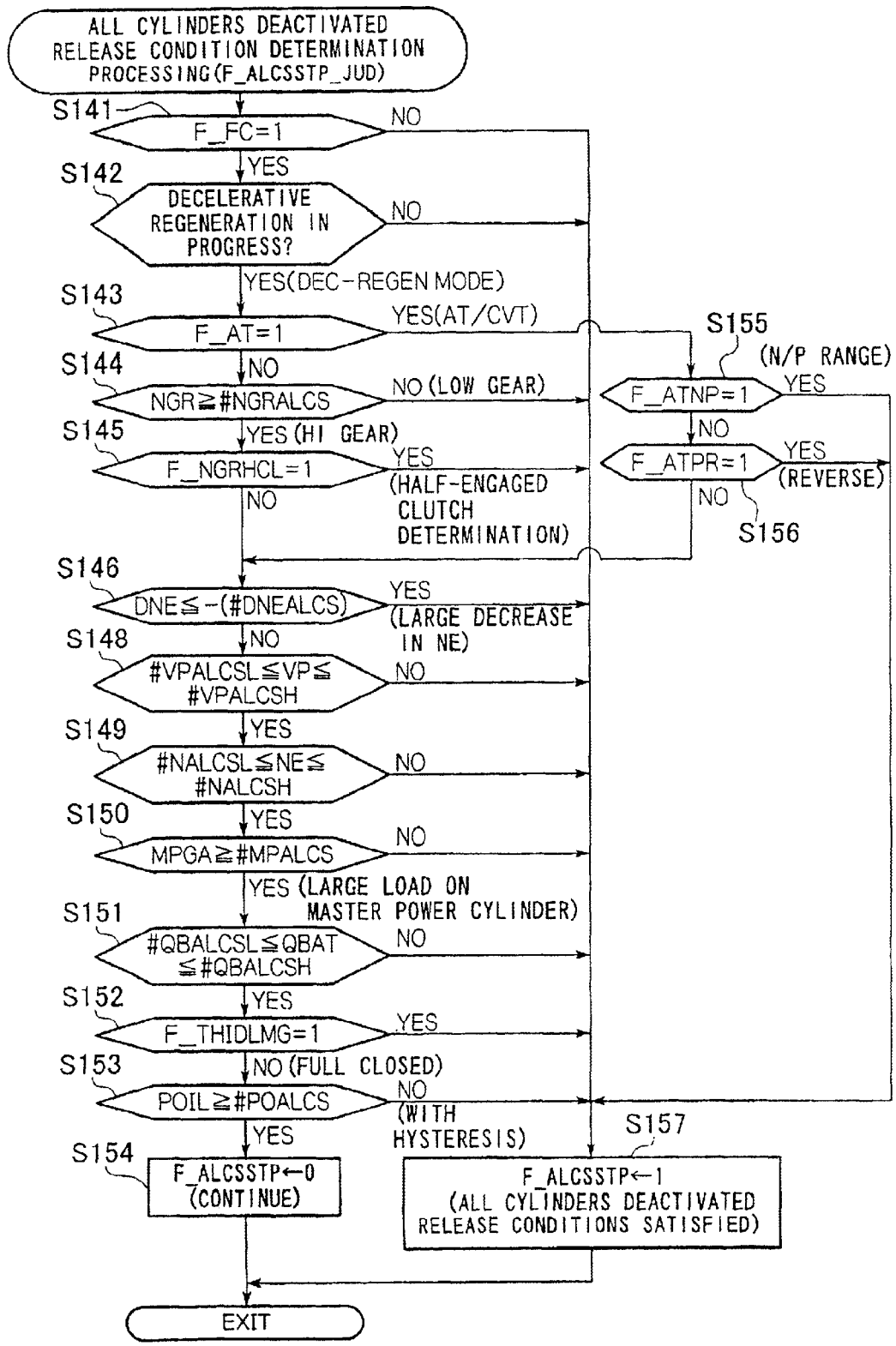
FIG. 8 is a flow-chart showing an all cylinders deactivated release condition determination processing according to one embodiment of the present invention.

When a vehicle is traveling in a mode other than the deceleration mode, in step S141 in FIG. 8, the fuel cut flag F_FC becomes "0", the all cylinders deactivated operation release conditions are satisfied (F_ALCSSTP=1), and the determination in step S106 in FIG. 6 becomes "YES". Thus, in step S120 the all cylinders deactivated operation execution flag F_ALCS becomes "0", and the all cylinders deactivated operation is not carried out.

Figure 9:
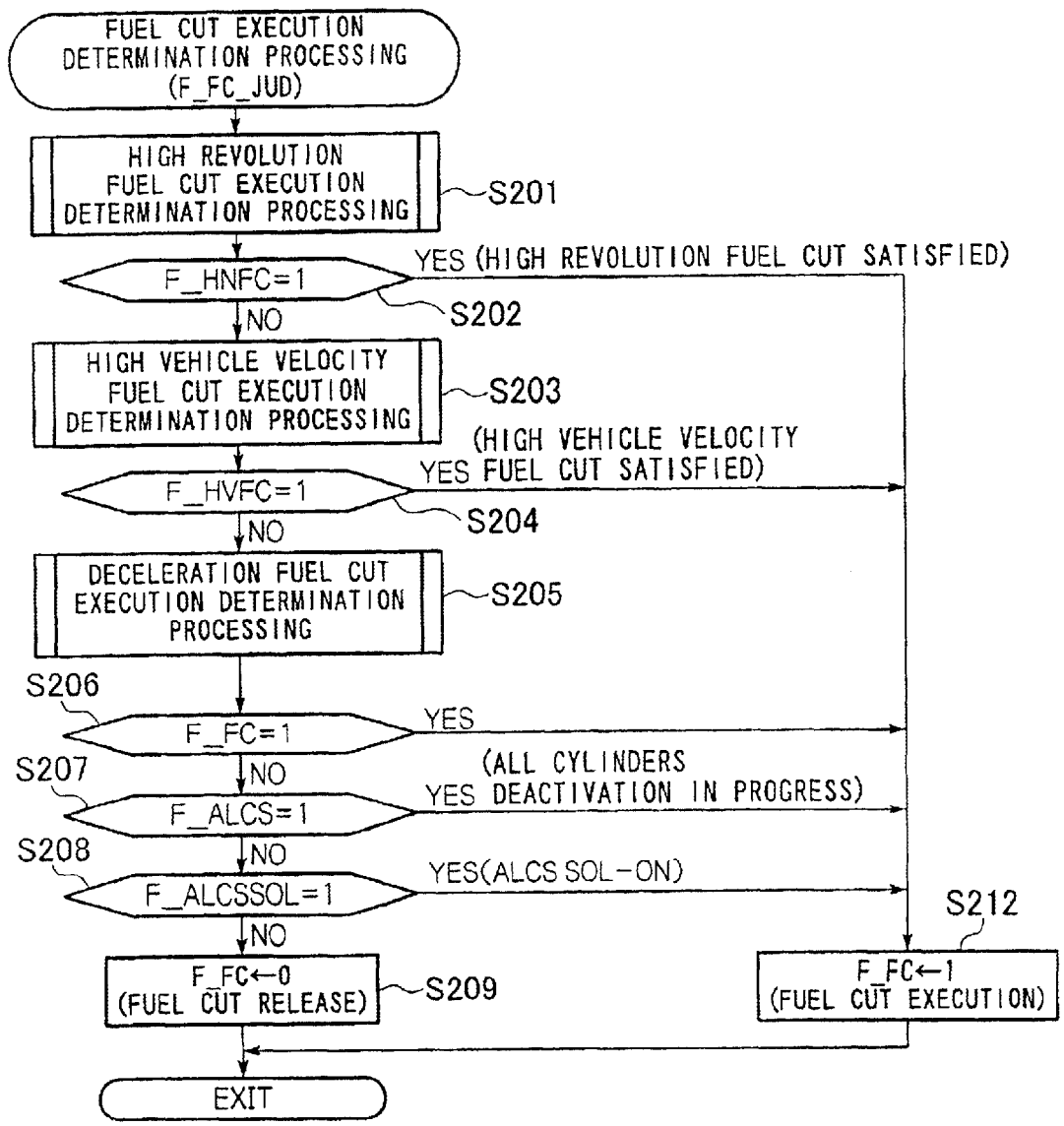
FIG. 9 is a flow-chart showing a fuel cut execution determination processing according to the present invention.

In contrast, when the traveling vehicle enters the deceleration regeneration mode (deceleration regeneration permission flag F_MADECRGN=1), the fuel cut flag F_FC in step S141 of FIG. 8 becomes 1, and the fuel cut flag F_FC in step S212 of FIG. 9 becomes "1". The preconditions prior to the all cylinders deactivated operation in step S104 of FIG. 6 are thereby satisfied. When the all cylinders deactivated release conditions in step S106 are not satisfied, after the passage of a predetermined time interval (TALCSDLY1) from the determination in step S106, the solenoid of the spool valve in step S109 is operated into the ON state. In addition, when the oil pressure (POIL) becomes equal to or greater than a predetermined value (#POILCSH), and furthermore, after passage of a predetermined time interval (TCSDLY1), the all cylinders deactivated operation execution flag F_ALCS in step S113 becomes "1", and the all cylinders deactivated operation is carried out.

Figure 12:
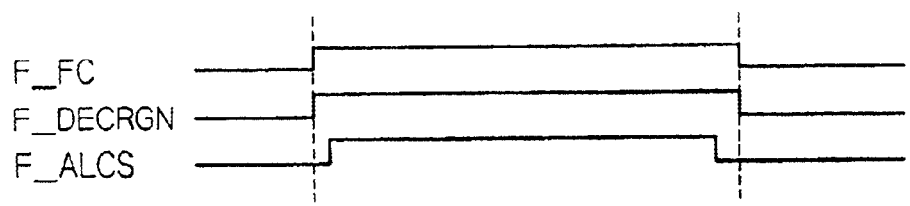
FIG. 12 is a diagram showing a time chart according to one embodiment of the present invention.

As a result, as shown in the time chart of FIG. 12, when the fuel cut flag F_FC and the deceleration regeneration permission flag F_MADECRGN become "1", the all cylinders deactivated operation execution flag F_ALCS then becomes "1".

During the all cylinders deactivated operation, when the all cylinders deactivated operation release conditions in step S106 of FIG. 6 are satisfied, until the passage of a predetermined time interval (TALCSDLY2) after the release conditions are satisfied, the solenoid of the spool valve is operated in step S116 to the OFF state. In addition, the oil pressure (POIL) becomes equal to or less than a predetermined value (#POILCSL), and furthermore, after the passage of a predetermined time interval (TCSDLY2), in step S120, the all cylinders deactivated operation execution flag F_ALCS becomes "0", and the vehicle is being driven in the normal operation. That is, as shown in FIG. 9, after both the all cylinders deactivated operation execution flag F_ALCS and the all cylinders deactivated solenoid flag F_ALCSSOL become "0", as shown in the time chart in FIG. 12, the fuel cut flag F_FC (and the decelerative regeneration permission flag F_MADECRN) becomes 0, that is, the fuel cut is released, and the normal operation starts.

According to the above embodiment, when the all cylinders deactivated operation is permitted during the fuel cut by the all cylinders deactivated operation execution flag F_ALCS (=1), the all cylinders deactivated operation can be conducted by the variable valve timing mechanism VT, so that both of the fuel cut and the all cylinders deactivated operation serves to suppress the fuel consumption and serves to improves the fuel consumption efficiency.

When it is determined that the all cylinders deactivated operation is released by determining the all cylinders deactivated operation execution flag F_ALCS (=0), and when it is detected by the all cylinders deactivation solenoid flag F_ALCSSOL that the variable valve timing mechanism is not operating, it is possible to release stopping of the fuel supply to the engine and to restart the engine. Accordingly, the above operation does not permit to supply fuel during the all cylinders deactivated operation and allows smooth transition from the all cylinders deactivated operation to the normal operation without consuming useless fuel.

Since the variable valve timing mechanism VT closes both intake valves IV and exhaust valves EV of all cylinders, the all cylinders deactivated operation prevents loss of energy due to pumping of the engine and friction of the cylinders can be reduced, and also prevents inflow of fresh air into the exhaust system. Therefore, the all cylinders deactivated operation does not provide any significant efficiency loss in the transmission system and the temperature of the catalyzer can be maintained such that the optimum control of the exhaust system can be implemented.

When it is determined that the all cylinders deactivated operation is possible by determining the all cylinders deactivated standby flag F_ALCSSTB (F_ALCSSTB=1), when the spool valve SV for executing the deactivated operation of the engine is directed to operate for closing the inlet and exhaust valves (F_ALCSSOL=1), and when it is detected that the spool valve is reliably operated (F_ALCS=1), it becomes possible for the engine to reliably enter the all cylinders deactivated operation.

In contrast, when it is determined to release the all cylinders deactivated operation during the all cylinder deactivated operation (F_ALCS=1), when the spool valve SV is instructed so as to release the all cylinders deactivated operation (F_ALCSSOL=0), and when it is detected in step S117 that the spool valve has been surely released such that the engine can be converted to the normal operation, it is possible for the engine to reliably enter the normal operation.

In addition, since a timer value TALCSDLY1 prepared before entering the all cylinders deactivated operation, it is possible to ensure time for executing the fuel cut so that the engine operation can be smoothly converted to the all cylinders deactivated operation.

The determination as to whether to enter the cylinder deactivated operation or to release the cylinder deactivated operation is made after the predetermined time intervals set in steps S111 and S119, so that the time for actuating the actuator or for releasing the actuator can be guaranteed. Accordingly, the execution and the release of the all cylinders deactivated operation can be reliably conducted.

The spool valve operates (opens or close) the intake valve and exhaust valve of each cylinder by the hydraulic pressure over predetermined times TCSDLY1 and TCSDLY2, which are set depending on the oil temperature TOIL of the hydraulic fluid. Thus, it is possible to control the operational timing of the intake valves IV and the exhaust valve EV to be constant even when the oil temperature changes, so that the timing of entery into the all cylinders deactivated operation can be optimized.

Furthermore, since the operation of the spool valve by the hydraulic pressure (POIL) is reliably detected in steps S110 and S117, it is possible to reliably identify that the engine is in the cylinder deactivated operation or the normal operation.

What is claimed is:

1. A control apparatus for a hybrid vehicle comprising the driving power sources composed of an engine and a motor, wherein the motor generates regenerative power during deceleration depending on the deceleration state of the vehicle and the engine is a type of engine capable of executing an all cylinders deactivated operation, and wherein the control apparatus comprises:

a cylinder deactivation determination means for determining whether it is appropriate for said engine to enter a cylinder deactivated operation based on driving conditions of the vehicle;

a cylinder deactivation release determination means for determining whether it is appropriate for said engine during the cylinder deactivated operation to release the cylinder deactivated operation based on vehicle conditions;

a cylinder deactivation execution means for operating an actuator for executing the cylinder deactivated operation, when said cylinder deactivation determination means executes the cylinder deactivated operation;

an operation appropriateness determination means for determining whether the operation of the actuator is appropriate; and a cylinder deactivation control means for controlling the deactivated operation of said engine based on said cylinder deactivation determination means, said cylinder deactivation release determination means, said cylinder deactivation execution means, and said operation appropriateness determination means.

2. A control apparatus for a hybrid vehicle according to claim 1, wherein, after determinations by said cylinder deactivation determination means or said cylinder deactivation release determination means, said cylinder deactivation execution means operates said actuator after the passage of a predetermined time after the determinations.

3. A control apparatus for a hybrid vehicle according to claim 1, wherein said cylinder deactivation control means actuates or release said actuator after the passage of a predetermined time set by said operation appropriateness determination means.

4. A control apparatus for a hybrid vehicle according to claim 3, wherein said actuator which is actuated by said cylinder deactivation execution means is a mechanism for changing operational states of an intake valve and an exhaust valve by an oil pressure, and a predetermined time is set depending on the oil temperature.

5. A control apparatus for a hybrid vehicle according to claim 1, wherein when said engine enters the cylinder deactivated operation by said cylinder deactivation execution means, an intake valve and an exhaust valve of each cylinder are both closed.

6. A control apparatus for a hybrid vehicle according to claim 1, wherein said actuator which is actuated by said cylinder deactivation execution means is a mechanism for changing the operational states of an intake valve and an exhaust valve, and said operation appropriateness determination means determines the appropriateness of the actuator based on the oil temperature.

* * * * *